US012728886B1

(12) United States Patent
Baumgartner et al.

(10) Patent No.: US 12,728,886 B1
(45) Date of Patent: Sep. 8, 2026

(54) CONTROLLING AUTONOMOUS VEHICLE IN PRESENCE OF VEHICLE INSPECTION STATION

(71) Applicant: Aurora Operations, Inc., Pittsburgh, PA (US)

(72) Inventors: Brian Baumgartner, San Francisco, CA (US); Cameron Flannery, San Francisco, CA (US); Gary Mccarthy, Dallas, TX (US); Andrew Price, Denver, CO (US)

(73) Assignee: Aurora Operations, Inc., Pittsburgh, PA (US)

( * ) Notice: Subject to any disclaimer, the term of this patent is extended or adjusted under 35 U.S.C. 154(b) by 110 days.

(21) Appl. No.: 18/393,053

(22) Filed: Dec. 21, 2023

Related U.S. Application Data

(60) Provisional application No. 63/435,096, filed on Dec. 23, 2022.

(51) Int. Cl.
*B60W 60/00* (2020.01)
*B60Q 1/50* (2006.01)

(52) U.S. Cl.
CPC ........... *B60W 60/001* (2020.02); *B60Q 1/543* (2022.05); *B60W 2420/403* (2013.01); *B60W 2555/60* (2020.02); *B60W 2556/45* (2020.02); *B60W 2720/10* (2013.01)

(58) Field of Classification Search
None
See application file for complete search history.

(56) References Cited

U.S. PATENT DOCUMENTS

| | | | | |
|---|---|---|---|---|
| 12,147,928 | B1 * | 11/2024 | Skelton | H04W 4/029 |
| 2008/0136625 | A1 * | 6/2008 | Chew | G01V 5/20<br>340/540 |
| 2017/0039850 | A1 * | 2/2017 | Vanden Berg | G05D 1/0276 |
| 2021/0183186 | A1 * | 6/2021 | Patnaik | G01G 19/02 |
| 2022/0164895 | A1 * | 5/2022 | Beckwith | G07C 5/008 |
| 2022/0206500 | A1 * | 6/2022 | Patnaik | B60W 60/001 |
| 2022/0410894 | A1 * | 12/2022 | Foster | G06V 20/588 |
| 2023/0020966 | A1 * | 1/2023 | Foster | B60W 60/0015 |
| 2023/0140569 | A1 * | 5/2023 | Foster | B60W 30/146<br>701/400 |

* cited by examiner

*Primary Examiner* — Donald J Wallace
*Assistant Examiner* — Paysun Wu
(74) *Attorney, Agent, or Firm* — Gray Ice Higdon

(57) ABSTRACT

Systems and methods for determining whether a vehicle inspection station present within an environment of an autonomous vehicle is active or inactive are provided, to appropriately control the autonomous vehicle and to timely respond to detection of an active vehicle inspection station. When the vehicle inspection station is determined to be active, the autonomous vehicle can be controlled to arrive at an appropriate inspection location/spot within the vehicle inspection station, where while being held for vehicle inspection, the autonomous vehicle can be in an inspection mode. Systems and methods for further determining when or whether the vehicle inspection completes are also provided, to timely and appropriately release the autonomous vehicle from the inspection mode and to exit the vehicle inspection station.

26 Claims, 10 Drawing Sheets

CONTROLLING AUTONOMOUS VEHICLE IN PRESENCE OF VEHICLE INSPECTION STATION

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about an autonomous vehicle's surrounding environment, along with making and implementing decisions to appropriately control the autonomous vehicle given a current environment within which the autonomous vehicle is operating. For instance, for a current environment within which the autonomous vehicle is driving along a highway or a road near a border (state border or national border), autonomous vehicles can encounter one or more vehicle inspection stations that require certain type(s) of vehicles to undergo vehicle inspection at the vehicle inspection station.

SUMMARY

Implementations described herein are generally directed to determining whether a vehicle inspection station present in an environment of an autonomous vehicle is active or inactive, and to appropriately control the autonomous vehicle for vehicle inspection (may simply be referred to as "inspection") at the vehicle inspection station in response to determining that the vehicle inspection station is active. The vehicle inspection station can be a weigh station, a border patrol station, or other types of inspection stations. In some implementations, optionally, the autonomous vehicle can be in communication with a teleassist system to receive one or more teleassist operator inputs that enable the autonomous vehicle to properly arrive at an inspection location within the vehicle inspection station and/or to timely release the autonomous vehicle from an inspection mode when the vehicle inspection is complete, to exit the vehicle inspection station.

As a non-limiting practical example, the autonomous vehicle can drive in a highway or a road near (or crossing) a state border or a national border, and encounter one or more road signs indicating a presence of a vehicle inspection station ahead in the highway or the road. In this example, one or more sensors (e.g., front-facing camera or side camera) disposed on the autonomous vehicle can capture one or more images depicting the one or more road signs, and the autonomous vehicle can determine, based on processing the one or more captured images, whether the vehicle inspection station is active (i.e., open) or inactive (i.e., closed). For instance, one or more of the road signs can have a flashing light on (by turning on one or more light-emitting devices) to indicate that the vehicle inspection station is active. In this instance, the autonomous vehicle can determine that the vehicle inspection station is active.

Alternatively or additionally, the autonomous vehicle can determine or confirm whether the vehicle inspection station is active or inactive based on a road condition of an entrance to the vehicle inspection station. For instance, the entrance to the vehicle inspection station can be blocked using one or more road-blocking devices (e.g., cones, barriers, gates), and the autonomous vehicle can determine or confirm that the vehicle inspection station is closed in response to detecting the one or more road-blocking devices in one or more images that are collected by the one or more sensors of the autonomous vehicle and that depict the road condition of the entrance to the vehicle inspection station.

In some implementations, optionally, when a flashing light is detected from the one or more images depicting the aforementioned one or more road signs and when no road-blocking devices are detected from the one or more images depicting the road condition of the entrance to the vehicle inspection station, the autonomous vehicle can determine that the vehicle inspection is active.

Optionally, in some implementations, the one or more road signs can include a road sign that indicates a distance from the road sign to the vehicle inspection station. Alternatively or additionally, the one or more road signs can include a road sign that indicates a speed limit that becomes effective when the flashing light is on. Alternatively or additionally, the one or more road signs can include a road sign that indicates a type of vehicles subject to vehicle inspection at the vehicle inspection station, where the type of vehicles can include, for instance, trucks.

Optionally, in some implementations, in response to detecting one or more of the road signs that indicate a presence of a vehicle inspection station with the environment of the autonomous vehicle, the autonomous vehicle can enter a pre-inspection mode. In some implementations, in response to the autonomous vehicle entering the pre-inspection mode, the autonomous vehicle can communicate with a teleassist system to request establishment of a teleassist session. In these implementations, the autonomous vehicle may receive a teleassist operator input that indicates or confirms whether the vehicle inspection station is active or not, where the teleassist operator input can be received from a teleassist operator via a user interface of the teleassist system. The teleassist operator may, for instance, provide such teleassist operator input based on sensor data that is captured by the one or more sensors disposed on the autonomous vehicle and that is transmitted to the teleassist system for display to the teleassist operator. The sensor data here can include one or more images depicting one or more road signs that use flashing lights to indicate an operation status (be it active or inactive) of the vehicle inspection station, and/or one or more additional images depicting an entrance to the vehicle inspection station with or without road-blocking device(s). Alternatively or additionally, the teleassist operator may, for instance, provide such teleassist operator input based on communicating with the vehicle inspection station via a call or inquiry message.

In various implementations, in response to determining that the vehicle inspection station is active, the autonomous vehicle can be controlled to drive towards the vehicle inspection station. For instance, the autonomous vehicle can be controlled to change a lane (if not in the rightmost lane or sometimes the leftmost lane) and to enter an entrance to the vehicle inspection station. The autonomous vehicle can be controlled to adjust a driving speed based on one or more additional road signs (if there is any) along a road (sometimes a selected road/lane) that leads to an inspection location within the vehicle inspection station.

Optionally, the autonomous vehicle can be controlled to drive along the aforementioned selected road or lane based on one or more images (or a live video), captured by one or more image-capturing sensors disposed on the autonomous vehicle. The one or more images can depict a digital sign attached to a canopy of the vehicle inspection station indicating a lane selected for the autonomous vehicle (or selected based on a type of the autonomous vehicle, e.g., truck), or one or more physical objects placed on the ground defining one or more lanes that include the selected lane.

In various implementations, optionally, the autonomous vehicle can be controlled to arrive at the inspection location for vehicle inspection. In some implementations, after arriving at the inspection location for inspection, the autonomous vehicle can enter an inspection mode, and can remain in the inspection mode during inspection. For instance, during the vehicle inspection of the autonomous vehicle and while the autonomous vehicle is disposed/stopped at the inspection location, the autonomous vehicle can enter, and can subsequently remain in, the inspection mode. In some implementations, in response to the autonomous vehicle entering the inspection mode, a hazard light of the autonomous vehicle can be turned on or activated to indicate that the autonomous vehicle is in the inspection mode for inspection, where the hazard light can be turned off to indicate that the autonomous vehicle is released from the inspection mode once the vehicle inspection completes.

In various implementations, whether the inspection of the autonomous vehicle is complete can be determined. In various implementations, in response to determining that the inspection of the autonomous vehicle is complete, the autonomous vehicle can be released from the inspection mode and can be controlled to exit the vehicle inspection station. In some implementations, optionally, to determine whether the inspection of the autonomous vehicle is complete, the one or more sensors disposed on the autonomous vehicle can be used to monitor for one or more clear-to-proceed signals that indicate the inspection of the autonomous vehicle is complete. In this case, if a clear-to-proceed signal, of the one or more clear-to-proceed signals, that indicates the inspection of the autonomous vehicle is complete is detected, it can be determined that the inspection of the autonomous vehicle is complete.

Optionally, the one or more clear-to-proceed signals that indicate the inspection of the autonomous vehicle is complete can include: an electronic signal clearing the autonomous vehicle to proceed out of the vehicle inspection station, a human gesture indicating that the autonomous vehicle is clear to proceed, or a voice command indicating that the autonomous vehicle is clear to proceed. Optionally, during the vehicle inspection of the autonomous vehicle and while the autonomous vehicle is disposed/stopped at the inspection location, an inspection barrier may be placed in front of the autonomous vehicle to indicate that the autonomous vehicle is under inspection, and in this case, the one or more clear-to-proceed signals can include a removal of the inspection barrier from the front of the autonomous vehicle, as a clear-to-proceed signal. In some implementations, the inspection barrier can have a predetermined or distinct design that distinguishes the inspection barrier from other types of barriers, such that detection of the such a barrier in front of the autonomous vehicle prior to an inspection, followed by detection of removal of the barrier, can be understood to be a positive indication from an inspection authority that the inspection is complete and the autonomous vehicle is clear to proceed.

In some implementations, the autonomous vehicle can be subject to further inspection at an additional inspection location of the vehicle inspection station. For instance, the autonomous vehicle can detect, via the one or more sensors, a secondary inspection signal indicating a requirement for further inspection at the additional inspection location (e.g., an open area near an exit of the vehicle inspection vehicle) to provide document(s) or record(s) of cargo carried by the autonomous vehicle (e.g., an autonomous truck). In response to detecting such a secondary inspection signal, the autonomous vehicle can be controlled to leave the inspection location for the additional inspection location.

Optionally, the secondary inspection signal can be an electronic signal indicating that the autonomous vehicle needs further inspection, a human gesture indicating that the autonomous vehicle needs further inspection, or a voice command indicating that the autonomous vehicle needs further inspection.

Optionally, the aforementioned teleassist session can be kept alive until the autonomous vehicle is released from the inspection mode. Alternatively, an additional teleassist session can be established between the autonomous vehicle and the teleassist system in response to the autonomous vehicle requesting a new teleassist session after the autonomous vehicle enters the entrance to the vehicle inspection station or after the autonomous vehicle enters the inspection mode. During the aforementioned teleassist session or the additional teleassist session, the autonomous vehicle can receive a teleassist operator input indicating that the inspection of the autonomous vehicle is complete, and in response, the autonomous vehicle can be released from the inspection mode to exit the vehicle inspection station.

By using the techniques described herein, one or more technical advantages can be achieved. As one non-limiting example, the techniques described herein enable the autonomous vehicle to automatically determine whether a vehicle inspection station is active or inactive, using a wide range of sensors disposed on different areas of the autonomous vehicle. For instance, the wide range of sensors can be utilized to capture sensor data depicting one or more road signs associated with the vehicle inspection station as well as an entrance to the vehicle inspection station. Further, such sensor data and/or additional information (e.g., one or more messages or additional sensor data) can be transmitted, before reaching the entrance to the vehicle inspection station, to a remote teleassist system to receive a teleassist operator input indicating whether the vehicle inspection station is active. In addition to being based on the sensor data and/or the additional information received from the autonomous vehicle, the teleassist operator input can be further based on a call or message to the vehicle inspection station (in case the sensor data and/or the additional information cannot provide a clear determination of the operating status of the vehicle inspection station). Accordingly, the accuracy of determining whether the vehicle inspection station is active can be improved.

As another non-limiting example, the techniques described herein enable the autonomous vehicle control system and/or the teleassist system to timely determine whether vehicle inspection of the autonomous vehicle is complete or further inspection is required, so that the autonomous vehicle can be controlled to exit the vehicle inspection station timely and appropriately or the autonomous vehicle can be appropriately controlled to arrive at the additional inspection location for further inspection.

The above description is provided as an overview of only some implementations disclosed herein for the sake of example. Those implementations, and other implementations, are described in additional detail herein. It should be understood that techniques disclosed herein can be implemented locally on a client device, remotely by server(s) connected to the client device via one or more networks, and/or both.

DETAILED DESCRIPTION

Figure 1:
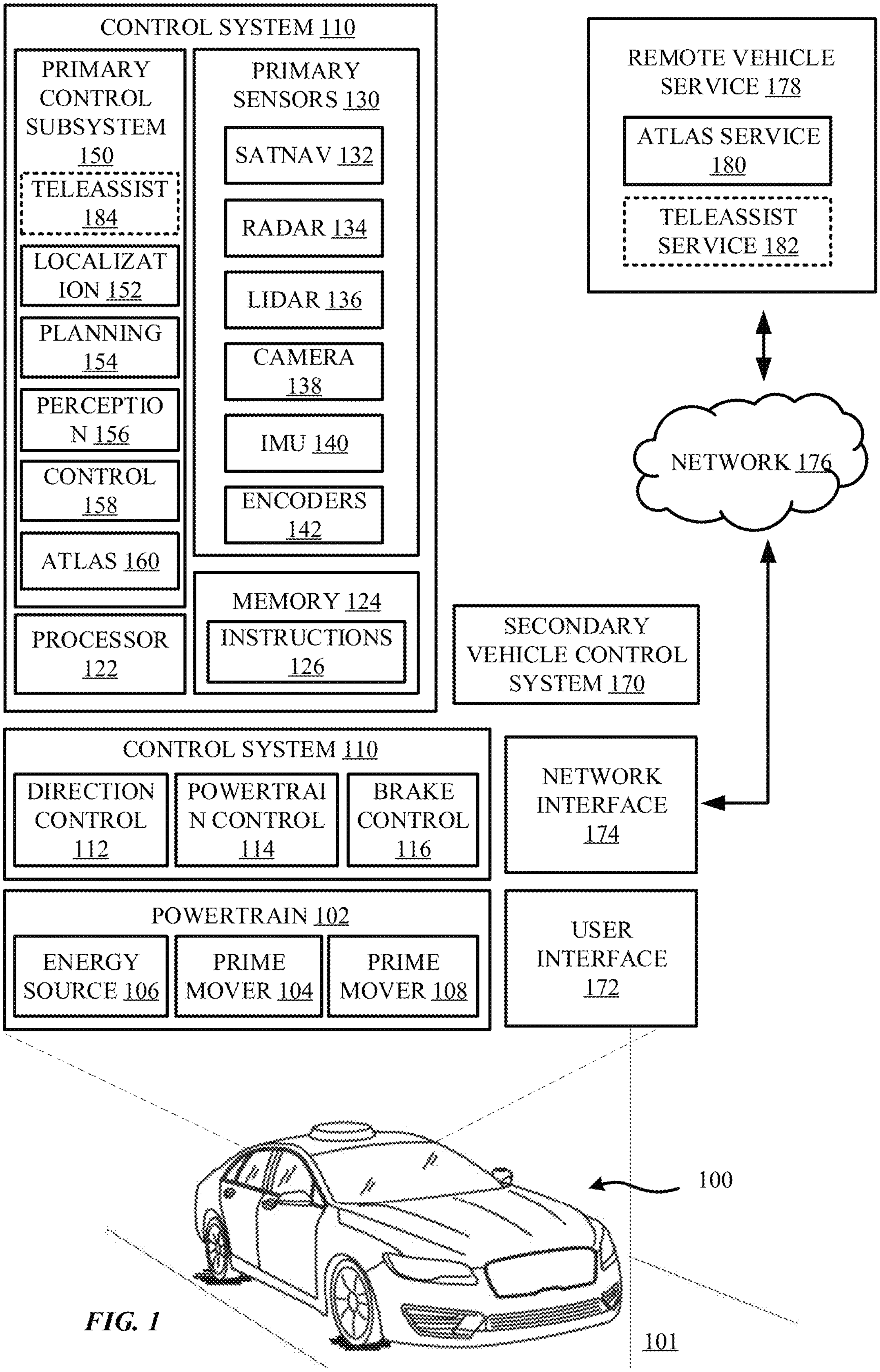
FIG. 1 illustrates an example hardware and software environment for an autonomous vehicle.

The various implementations discussed hereinafter are generally directed to systems and methods for determining whether a vehicle inspection station present within an environment of an autonomous vehicle is active or inactive, so that the autonomous vehicle can be appropriately controlled and responds to detection of an active vehicle inspection station. The vehicle inspection station can be a weigh station, a border patrol station, or other inspection station which, when having an active operating status, requires the autonomous vehicle to arrive at an inspection location of the vehicle inspection station for vehicle inspection. The environment here can be an area within a field of view of a sensor system disposed on the autonomous vehicle, where the sensor system can include one or more sensors such as a camera, an acoustic sensor, or other types of sensors, including but not limited to, those sensors described in more detail later in this specification. When the vehicle inspection station is determined to be active, the autonomous vehicle, for instance, can be controlled to one or more corresponding actions, such as activate a turn signal (e.g., right-turn signal), reduce a speed, and/or change to the rightmost lane, to enter an entrance to the vehicle inspection station for vehicle inspection. When the vehicle inspection station is determined to be inactive, the autonomous vehicle may be controlled to bypass the vehicle inspection station, for example, by driving in a current lane and at a current speed.

Optionally, whether the vehicle inspection station is active or inactive can be determined by the autonomous vehicle itself, for example, via an autonomous vehicle control system that is local to the autonomous vehicle. Alternatively or additionally, whether the vehicle inspection station is active or not can be determined with assistance from a teleassist system (e.g., including or sometimes be referred to as, "remote teleassist system") that is remote to the autonomous vehicle. It's noted that the teleassist system can include or otherwise communicate with a local component at the autonomous vehicle to initiate a teleassist session between the autonomous vehicle and the remote teleassist system, where during the teleassist session, the autonomous vehicle can transmit information such as messages and/or sensor data to the remote teleassist system and receive, from the remote teleassist system, a teleassist operator input (or a command or message generated based on the teleassist operator input) that suggests one or more vehicle control operations to control the autonomous vehicle. The teleassist operator input can be determined based on the information (message, sensor data, etc.) received from the autonomous vehicle. Alternatively or additionally, the teleassist operator input can be determined based on additional information (e.g., a confirmation message or reply indicating an operating status of the vehicle inspection station, radio) received from the vehicle inspection station (e.g., after calling or texting a number provided by the vehicle inspection station).

In various implementations, the teleassist operator input can be received by the remote teleassist system from a teleassist operator trained to handle situations involving vehicle inspection station(s), via a user interface of a display or microphone(s) that are part of the remote teleassist system. As a non-limiting example, the teleassist operator input can be a selection of a selectable graphical user interface (GUI) element configured at the user interface of the display to suggest a vehicle control operation of "entering an entrance to vehicle inspection station", where based on such teleassist operator input that suggests the vehicle control operation of "entering an entrance to vehicle inspection station", the autonomous vehicle can be controlled (e.g., via the autonomous vehicle control system local to the autonomous vehicle) to perform one or more actions (e.g., activate a turn signal, change to the rightmost lane, reduce a speed, select a lane leading to an appropriate inspection spot if the inspection location includes multiple inspection spots, etc.) that completes the suggested vehicle control operation. Alternatively, as another non-limiting example, the teleassist operator input can suggest a first vehicle control operation of activating a turn signal, followed up by a second teleassist operator input that suggests changing to the rightmost lane, and/or followed up by a third teleassist operator input that suggests reducing a speed of the autonomous vehicle to conform to a speed limit provided by a road sign (if there is any) that is placed proximate to the entrance to the vehicle inspection station.

After the autonomous vehicle arrives at the inspection location (or in some case, an inspection spot from multiple inspection spots of the inspection location), the autonomous vehicle can be controlled in an inspection mode until vehicle inspection completes. The aforementioned autonomous vehicle control system and/or the remote teleassist system can be applied to determine when the vehicle inspection of the autonomous vehicle completes (or in some cases, whether further inspection at an additional inspection location is needed for the autonomous vehicle), thereby appropriately and timely releasing the autonomous vehicle from the inspection mode to exit the vehicle inspection station (or to arrive at the additional inspection location). Descriptions or examples illustrating the inspection mode, the determination of whether or when the vehicle inspection completes, the determination of whether further inspection is needed, and various other features or technical benefits achieved by these features can be found in descriptions below or elsewhere of this disclosure (e.g., summary and figures) and are omitted herein to avoid repeated descriptions.

The following description with reference to the accompanying drawings is provided for understanding of various implementations of the present disclosure. It's appreciated that different features from different embodiments/implementations may be combined with and/or exchanged for one another. In addition, those of ordinary skill in the art will recognize that various changes and modifications of the various embodiments/implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor(s) to enable a clear and consistent understanding of the present disclosure. Accordingly, it should be apparent to those skilled in the art that the following description of various embodiments/implementations of the present disclosure is provided for the purpose of illustration only and not for the purpose of limiting the present disclosure as defined by the appended claims and their equivalents.

FIG. 1 illustrates an example autonomous vehicle 100 within which the various techniques disclosed herein may be implemented. The autonomous vehicle 100, for example, is shown driving on a road 101, and the autonomous vehicle 100 may include a powertrain 102 including a prime mover 104. The prime mover 104 can be powered by an energy source 106, and be capable of providing power to a drivetrain 108, as well as to a control system 110, where the control system 110 can include a direction control 112, a powertrain control 114 and a brake control 116. The autonomous vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source 106 may include a fuel system (e.g., providing gasoline, diesel, hydrogen, etc.), a battery system, solar panels or other renewable energy source, a fuel cell system, etc. The drivetrain 108 may include wheels and/or tires along with a transmission and/or any other mechanical drive components suitable for converting the output of the prime mover 104 into vehicular motion. The drivetrain 108 may further include: one or more brakes configured to controllably stop or slow the vehicle, and direction or steering components suitable for controlling the trajectory of the vehicle. The direction or steering components, for instance, can include a rack and pinion steering linkage that enables one or more wheels of the autonomous vehicle 100 to pivot about a generally vertical axis, thereby varying an angle of the rotational planes of the wheels relative to the longitudinal axis of the autonomous vehicle 100. In some implementations, combinations of powertrains and energy sources may be used, e.g., in the case of electric/gas hybrid vehicles, and in some instances, multiple electric motors (e.g., dedicated to individual wheels or axles) may be used as a prime mover. In the case of a hydrogen fuel cell implementation, the prime mover 104 may include one or more electric motors, and the energy source 106 may include a fuel cell system powered by hydrogen fuel.

The direction control 112 may include one or more actuators and/or sensors for controlling and receiving feedback from the direction or steering components to enable the vehicle to follow a desired trajectory. The powertrain control 114 may be configured to control the output of powertrain 102, e.g., to control the output power of prime mover 104, to control a gear of a transmission in drivetrain 108, etc., thereby controlling a speed and/or direction of the autonomous vehicle 100. The brake control 116 may be configured to control one or more brakes that slow or stop the autonomous vehicle 100, e.g., disk or drum brakes coupled to the wheels of the autonomous vehicle 100.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over the autonomous vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from an environment of the autonomous vehicle 100, for use in controlling the operation of the autonomous vehicle 100 within the environment. The primary sensor system 130, for example, may include a satellite navigation (SATNAV) sensor 132, a radio detection and ranging (RADAR) sensor 134, a light detection and ranging (LIDAR) sensor 136, a digital camera 138, an inertial measurement unit (IMU) 140, and/or one or more wheel encoders 142. The primary sensor system 130 may further include one or more acoustic sensors (not shown), such as microphones or other devices that capture audio data from the environment of the autonomous vehicle.

The SATNAV sensor 132 may be compatible with any of various satellite navigation systems such as GPS, GLONASS, Galileo, Compass, etc., and may be used to determine the location of the autonomous vehicle 100 on the Earth using satellite signals. The RADAR sensor 134, the LIDAR sensor 136, as well as the digital camera 138 (which may include various types of image-capturing devices capable of capturing still and/or video imagery), may be used to sense stationary and moving objects within the immediate vicinity of the autonomous vehicle 100. The IMU 140 may include multiple gyroscopes and accelerometers that are capable of detection linear and rotational motion of the autonomous vehicle 100 in three directions, while the one or more wheel encoders 142 may be used to monitor the rotation of one or more wheels of the autonomous vehicle 100.

The outputs of sensors 132-142 may be provided to a set of primary control subsystems 150, including, for example, a localization subsystem 152, a planning subsystem 154, a perception subsystem 156, and a control subsystem 158. The localization subsystem 152 is principally responsible for precisely determining the location and orientation (also sometimes referred to as "pose", which in some instances may also include one or more velocities and/or accelerations) of the autonomous vehicle 100 within its surrounding environment, and generally within some frame of reference. The planning subsystem 154 is principally responsible for planning a path of motion for the autonomous vehicle 100 over some timeframe given a desired destination as well as objects (static and/or moving) within the environment, while the perception subsystem 156 is principally responsible for detecting, tracking and/or identifying elements (e.g., objects) within the environment surrounding the autonomous vehicle 100. The control subsystem 158 is principally responsible for generating suitable control signals for controlling the various controls in the control system 110 in order to implement the planned path of the autonomous vehicle 100. Any number of, or all of, the localization subsystem 152, planning subsystem 154, perception subsystem 156, and control subsystem 158 may have associated data that is generated and/or utilized in connection with the operation thereof, and that which may be communicated to a teleassist system 184 (optional) in some implementations.

In addition, an atlas or map subsystem 160 may be provided in the illustrated implementations to describe the elements within an environment and the relationships therebetween. The atlas subsystem 160 may be accessed by each of the localization, planning, perception, and control subsystems 152-156 to obtain various information about the environment for use in performing their respective functions. The atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, the atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by the autonomous vehicle 100 may be used in other implementations, including systems based upon absolute positioning. Furthermore, it will be appreciated that at least some of the map data that is generated and/or utilized by the atlas subsystem 160 may be communicated to the teleassist system 184 in some implementations.

It will be appreciated that the collection of components illustrated in FIG. 1 for the primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while the subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executable by one or more processors 122. It will be further appreciated that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in the primary vehicle control system 120 may be networked in various manners.

In some implementations, the autonomous vehicle 100 may also include a secondary vehicle control system 170, which may be used as a redundant or backup control system for the autonomous vehicle 100. In some implementations, secondary vehicle control system 170 may be capable of fully operating the autonomous vehicle 100 in the event of an adverse event in the primary vehicle control system 120, while in other implementations, the secondary vehicle control system 170 may only have limited functionality, e.g., to perform a controlled stop of the autonomous vehicle 100 in response to an adverse event (e.g., an emergency vehicle fast approaches the autonomous vehicle 100 from behind) detected using the primary vehicle control system 120. In still other implementations, the secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the autonomous vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in the autonomous vehicle 100 outside of the purposes of autonomous control, e.g., to control entertainment systems, to operate doors, lights, convenience features, etc.

In addition, for additional storage, the autonomous vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, the autonomous vehicle 100 may include a user interface (I/F) 172 to enable the autonomous vehicle 100 to receive a number of inputs from a user or an operator (e.g., a remote teleassist operator of the teleassist subsystem 184), and to present outputs for the user or the operator, via, for instance, one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, the autonomous vehicle 100 may include one or more network interfaces (I/Fs), e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which the autonomous vehicle 100 receives environmental and other data for use in autonomous control thereof. In the illustrated implementations, for example, the autonomous vehicle 100 may be in communication with a cloud-based remote vehicle service 178 including, at least for the purposes of implementing various functions described herein, an atlas or map service or system 180. Optionally, in some implementations, the cloud-based remote vehicle service 178 can further include a teleassist service or system 182. The atlas or map service or system 180 may be used, for example, to maintain a global repository describing one or more geographical regions of the world, as well as to deploy portions of the global repository to one or more autonomous vehicles (e.g., including the autonomous vehicle 100), to update the global repository based upon information received from one or more autonomous vehicles, and to otherwise manage the global repository. The teleassist service or system 182 may be used, for example, to provide teleassist support to the autonomous vehicle 100, e.g., through communication with the teleassist subsystem 184 resident in the primary vehicle control system 120, as will be discussed in greater detail below.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the autonomous vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary hardware and/or software components illustrated in FIG. 1 is not intended to limit the present invention. Indeed, those skilled in the art will recognize that other alternative or additional hardware and/or software components may be used without departing from the scope of the invention.

Operating the autonomous vehicle 100 in the complex and dynamic environments within which automobiles regularly operate often necessitates handling a diverse array of conditions that, while comparatively uncommon, are still regularly encountered by the autonomous vehicle 100 or other autonomous vehicles over time. Autonomously handling these uncommon conditions in both a performant and safe way can be challenging, and some proposed approaches to addressing these uncommon conditions incorporate the use of teleassist ("human-in-the-loop") technology, to enable a human operator, who may be remote from the vehicle, to make decisions and assist in guiding a vehicle (e.g., the autonomous vehicle 100) whenever some of these uncommon conditions are encountered by the vehicle.

Some proposed teleassist approaches focus on direct control of the autonomous vehicle 100 by a remote operator, whereby the remote operator is provided with sensor data collected by the autonomous vehicle 100 and is able to directly control the autonomous vehicle 100 remotely. It has been found, however, that direct control of the autonomous vehicle 100 in such circumstances generally requires a fast, responsive and reliable network connection between the remote operator and the autonomous vehicle 100. Network connectivity and latency for the autonomous vehicle 100, however, can vary considerably based upon location (e.g., urban or rural, highway or side road, etc.) and network congestion. In addition, remote operators, even when provided with sensor data collected by the autonomous vehicle 100, may still lack full situational awareness due to the fact that they are not physically within the vehicle.

The disclosed implementations, on the other hand, focus on an indirect control methodology whereby the teleassist service 182 is able to provide suggestions or recommendations to the autonomous vehicle 100, while requiring any such directives or recommendations to be validated by the autonomous vehicle 100 prior to being implemented. By doing so, safety and/or performance of the vehicle may be effectively decoupled from the performance of the network that links the teleassist service with the autonomous vehicle.

Figure 2A:
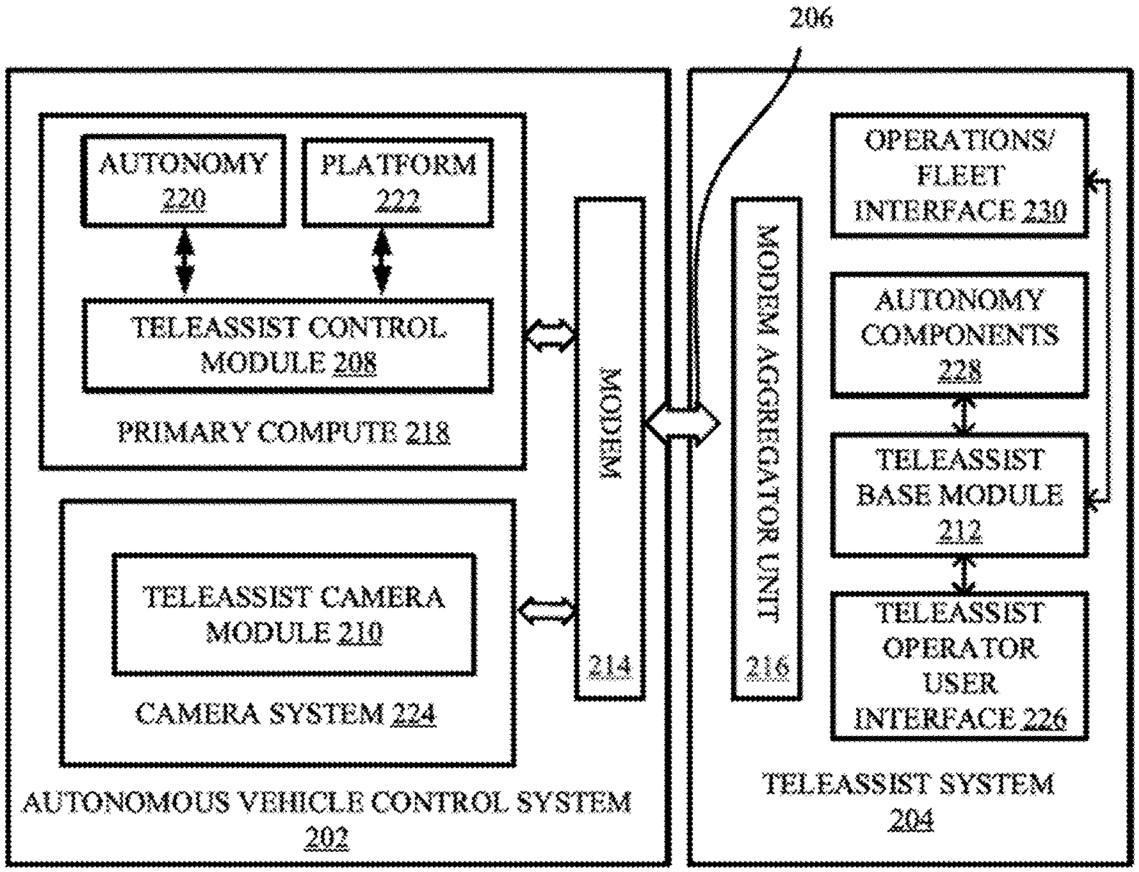
FIG. 2A is a block diagram illustrating an example teleassist-enabled system consistent with some implementations.

While systems (e.g., autonomous vehicle control system local to an autonomous vehicle) and methods in this disclosure can be implemented without assistance from teleassist, FIG. 2A illustrates a non-limiting example of a teleassist-enabled system (or service) 200. As shown in FIG. 2A, an autonomous vehicle 202 interfaces with a teleassist system 204 that is remote to the autonomous vehicle 202, over a network 206. The teleassist system 204 may be physically remote from the autonomous vehicle 202, and will generally support interface with multiple vehicles (including the autonomous vehicle 202) to enable multiple teleassist operators to concurrently interact with the multiple vehicles. As will become more apparent below, teleassist operators may actively and continuously monitor individual vehicles in some implementations, while in other implementations, individual teleassist operators may interact with multiple vehicles at different times, e.g., so that a particular operator may support multiple vehicles at one time. In some implementations, for example, teleassist operators may be selectively coupled to particular autonomous vehicles on an on-demand basis, e.g., in response to requests generated by the vehicles whenever certain conditions (e.g., various uncommon situations that may benefit from teleassist support) arise. In some implementations, a pool of operators may support a pool of autonomous vehicles, and the teleassist system 204 may initiate, or approve the initiation of, teleassist sessions on an on-demand basis, e.g., based upon requests initiated by autonomous vehicles, the teleassist system, or both.

Teleassist support may be implemented in some implementations using a teleassist control module 208, as well as a teleassist camera module 210, of the autonomous vehicle 202 that is in communication with a teleassist base module 212 of the teleassist system 204. The modules 208 and 210 of the autonomous vehicle 202 may be coupled to the network 206 through a modem 214, while the teleassist base module 212 of the teleassist system 204 may be coupled to the network 206 through a modem aggregator unit 216 that is capable of communicating with multiple modems 214 of multiple autonomous vehicles 202. The network 206 may be implemented in part using a wireless network such as a 4G, LTE or 5G network, a satellite network, or some combination thereof, although the invention is not so limited.

The teleassist control module 208 may be resident in some implementations within a primary compute system 218 of the autonomous vehicle 202, and may interface with each of an autonomy system 220 and platform 222 of the autonomous vehicle 202 to collect and stream data from the primary compute system 218 to the teleassist system 204 as well as receive and process teleassist operator inputs (sometimes referred to as "operator inputs") received from the teleassist system 204. In some implementations, the primary compute system 218 may be implemented in a similar manner to the primary vehicle control system 120 illustrated in FIG. 1, with the autonomy system 220 representing high level autonomous control subsystems such as localization, planning, perception, etc., and with the platform 222 representing lower level vehicle controls such as provided by control subsystem 158. However, it will be appreciated that teleassist control module 208 may interface with any autonomy or control-related aspect of the autonomous vehicle 202 in other implementations.

The teleassist camera module 210 may be resident in some implementations within a camera system 224 that manages the on-board cameras on the autonomous vehicle 202, and the teleassist camera module 210 may, in some implementations, stream camera feed data collected from the on-board cameras to the teleassist system 204 for viewing by an operator ("teleassist operator") during a teleassist session. As will become more apparent below, in some implementations, the teleassist camera module 210 may dynamically vary the data streamed from the on-board cameras, e.g., to vary the priority, quality and/or resolution of each camera feed.

While modules 208 and 210 are implemented separately in FIG. 2A, in other implementations, the functionality allocated to each module may vary, or the functionality may be combined into a single module or split into more than two modules. As such, the invention is not limited to the particular architecture illustrated in FIG. 2A.

The teleassist base module 212 communicates with modules 208 and 210 during a teleassist session with the autonomous vehicle 202, and may further manage multiple sessions for multiple vehicles and with multiple operators. The teleassist base module 212 may also manage scheduling, initiation and termination of sessions in some implementations.

A teleassist operator user interface 226 is coupled to the teleassist base module 212 to provide a user interface through which an operator, e.g., a human operator, may communicate with the autonomous vehicle 202 during a teleassist session. The teleassist operator user interface 226 may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation, the teleassist operator user interface 226 may be a web-based interface that interacts with an operator via a touchscreen display.

The teleassist system 204 may also include one or more autonomy components 228 interfaced with the teleassist operator user module 212. The autonomy components 228 may include various components that replicate the functionality of similar components in the autonomous vehicle 202 and/or that are also accessible to the autonomous vehicle 202 for use in connection with the primary control of the autonomous vehicle 220 (e.g., components 240, 242 and 244 discussed below in connection with FIG. 2B). For example, in some implementations, the teleassist operator user module 212 may have access to the same map data utilized by each vehicle, e.g., as provided by an atlas system as described above, as well as to similar layout functionality as is used by each vehicle to lay out map data in the immediate vicinity of the autonomous vehicle 202. By doing so, the teleassist operator user module 212 may effectively reconstruct a digital map of at least the fixed objects in the vicinity around the autonomous vehicle 202 without having to receive the entire digital map from the autonomous vehicle 202 itself, thereby reducing the volume of data streamed by the autonomous vehicle 202 for the purpose of reconstructing the environment around the autonomous vehicle 202.

In some implementations, the autonomous vehicle 202 may provide a current pose of the autonomous vehicle 202 as well as data regarding any dynamic entities (e.g., other vehicles, pedestrians, or other actors or objects detected in the environment but not represented in the map data) detected by the perception system, and from this more limited amount of data, a graphical depiction of the immediate vicinity around the autonomous vehicle 202 may be generated for display to a teleassist operator. In some implementations, the one or more autonomy components 228 may also replicate functionality implemented in the autonomous vehicle 202 to enable local assessment of how the autonomous vehicle 202 may respond to certain directives from the teleassist system 204. In some implementations, the one or more autonomy components 228 may have similar functionality to that implemented in the autonomous vehicle 202, but with greater capabilities and/or access to greater computing resources than may be available in the autonomous vehicle 202.

Moreover, in some implementations, the teleassist system 204 may be autonomous in nature as well, whereby the teleassist system 204 is effectively the teleassist operator with which the autonomous vehicle 202 interacts during a teleassist session. In such instances, the teleassist system 204 may assess the current context of the autonomous vehicle 202 and send commands, requests, directives, suggestions, etc, for addressing any conditions that triggered a teleassist session. In some implementations, for example, the teleassist system 204 may have access to more computing power than can practically be provided onboard the autonomous vehicle 202, and thus the teleassist system 204 may be capable of performing computationally complex evaluations to assist the autonomous vehicle 202.

The teleassist system 204 may also include an operations/fleet interface 230 to facilitate communication with other services that support autonomous vehicles. For example, it may be desirable in some implementations to provide an ability to request roadside assistance or recovery of the autonomous vehicle 202, or to provide log data for use in diagnosing vehicle issues associated with the autonomous vehicle 202. It may also be desirable to propagate data collected during a teleoperation session (e.g., data related to lane closures, detected construction or incidents, etc.) to other vehicles in a fleet. Moreover, data received and/or generated by the teleassist system 204 may be used as training data for further training various components of the autonomous vehicle 202, e.g., to improve the performance of a detector and reduce the occurrence of false positives, or to improve scenario selection and other decisions made by the autonomous vehicle 202 in response to certain sensor input. Other external services may also interface with the teleassist system 204 in other implementations, as well be apparent to those of ordinary skill having the benefit of the instant disclosure.

Figure 2B:
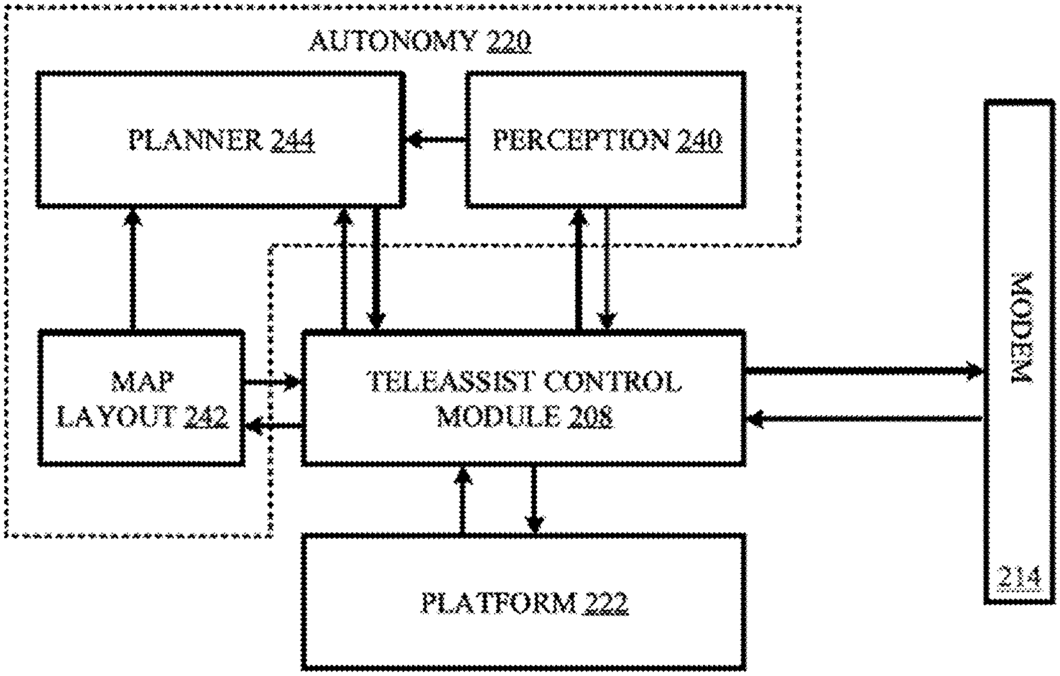
FIG. 2B is a block diagram further illustrating the teleassist control module referenced in FIG. 2A.

FIG. 2B provides an example implementation of the teleassist control module 208 in FIG. 2, as well as various interfaces supported thereby. As shown in FIG. 2B, in some implementations, the teleassist control module 208 may include one or more interfaces, e.g., application programming interfaces (APIs), to the teleassist system 204 (via the modem 212), to the platform 222, and to each of the perception component 240, map layout component 242, and planner component 244 of the autonomy component 220.

For the interface with the teleassist system 204, the teleassist control module 208 may be configured to communicate autonomy data (e.g., map data, perception data, route data, planning data), sensor data, telemetry data, etc. to the teleassist system 204 to provide the teleassist system 204 with the current status of the autonomous vehicle 202. The teleassist control module 208 may also be configured to communicate various teleassist requests to the teleassist system 204 and receive various teleassist commands therefrom. Further, the teleassist control module 208 may be configured to receive requests for visualizations and communicate requested visualizations to the teleassist system 204.

For the interface with platform 222, the teleassist control module 208 may be configured to receive vehicle state information (e.g., various types of diagnostic and/or sensor data) from the platform 222, and to issue various lower level commands to the platform 222, e.g., to honk a horn, activate or deactivate hazard lights, change gears, decommission the vehicle, initiate a controlled stop, etc.

For the interface with perception component 240, the teleassist control module 208 may be configured to receive from the perception component actors and/or tracks of actors detected in the environment, detections by various detectors 246 implemented in the perception component, and other perception-related data. All of such data may be communicated by the teleassist control module 208 to the teleassist system 204 as autonomy data.

For the interface with the map layout component 242, the teleassist control module 208 may receive, for example, local map data, route data and other map-related data from the map layout component 242. The teleassist control module 208 may also, in some instances, communicate map patches to the map layout component 242, e.g., to generate lane closures, traffic device overrides, new destinations, virtual path suggestions, etc., or to clear out prior generated map patches applied to the local map stored in the map layout component 242, e.g., when a prior lane closure has been removed. The map layout component 242 may also, in some instances, forward map and route updates to the planner component 244 to update scenarios being contemplated by the planner component 244 during the operation of the autonomous vehicle 202.

For the interface with the planner component 244, the teleassist control module 208 may receive, for example, generated plans, actor properties, alternate scenarios and other planning-related data. The teleassist control module 208 may also forward various teleassist commands to the planner component 244, as well as receive teleassist requests and/or feedback to teleassist commands from the planner component 244. Other functionality and variations will be appreciated by those of ordinary skill having the benefit of the instant disclosure. Therefore, the invention is not limited to the specific implementations of the teleassist system 204 discussed herein.

Figure 3:
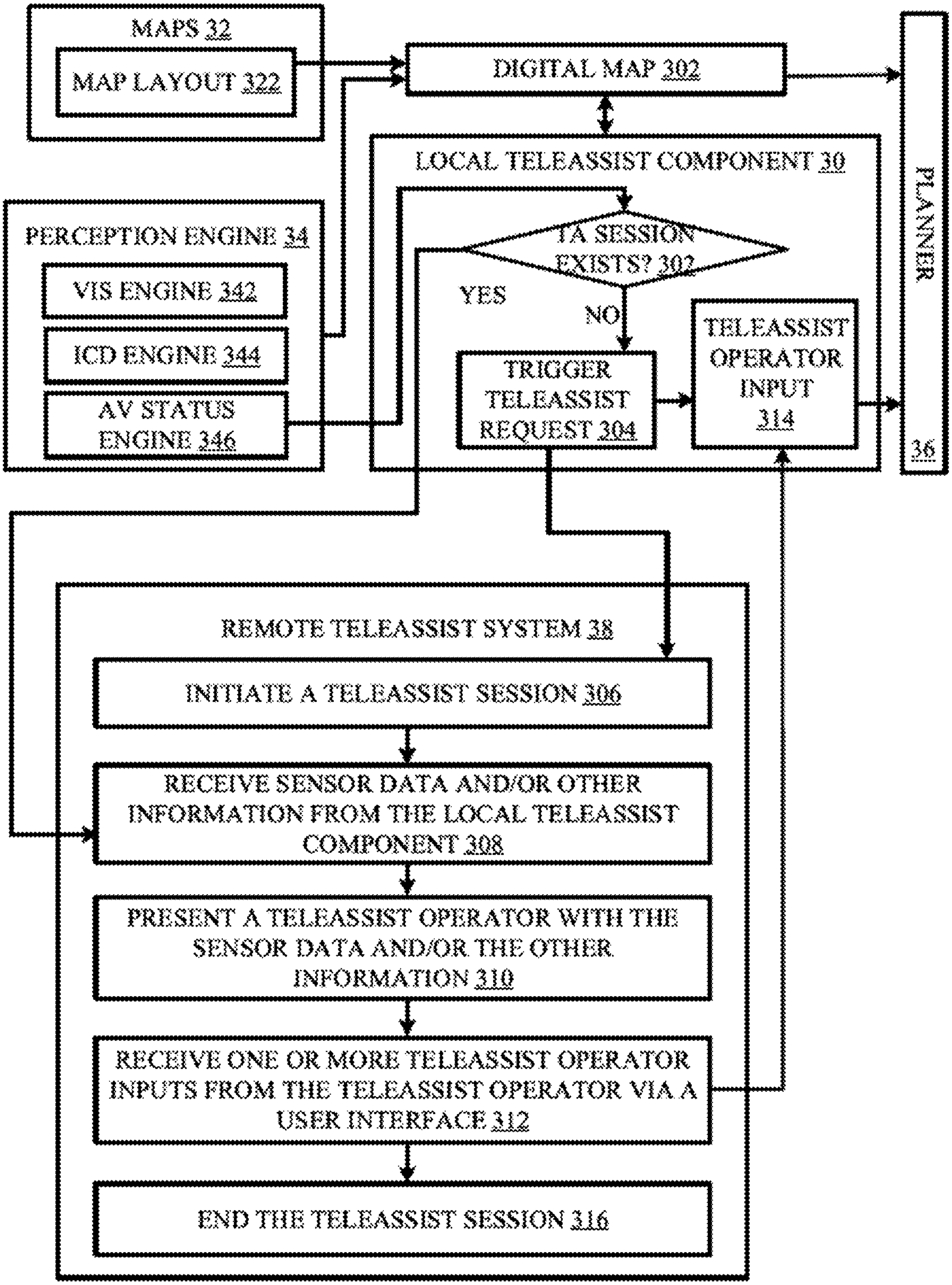
FIG. 3 is a block diagram illustrating an example teleassist-enabled system for controlling an autonomous vehicle, consistent with various implementations.

FIG. 3 is a block diagram illustrating a non-limiting example of a teleassist-enabled system 300 for determining whether inspection of an autonomous vehicle at an inspection location of a vehicle inspection station is complete. While the teleassist-enabled system 300 in FIG. 3 is illustrated to determine whether inspection of the autonomous vehicle at the inspection location is complete, the illustrated teleassist-enabled system 300 can also be applied to determine whether inspection of the autonomous vehicle at an additional inspection location of the vehicle inspection station is complete. Alternatively or additionally, the illustrated teleassist-enabled system 300 can be applied to determine or help determine whether the vehicle inspection station is active for the autonomous vehicle to decide whether or not to enter an entrance to the vehicle inspection station.

Figure 6A:
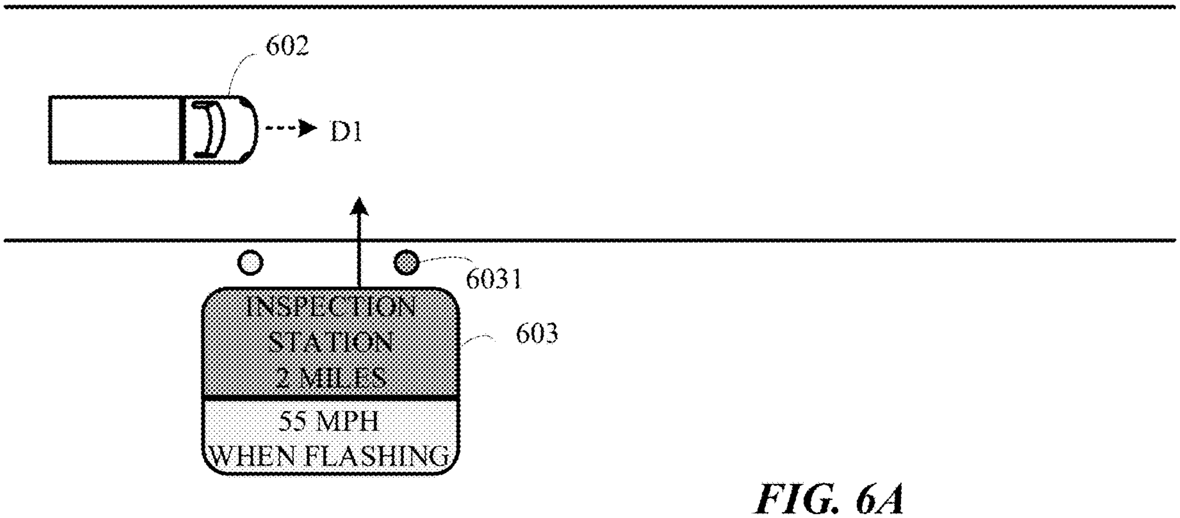
FIG. 6A, FIG. 6B, FIG. 6C, and FIG. 6D respectively illustrate one or more road signs an autonomous vehicle may encounter in an environment having a vehicle inspection station, consistent with various implementations.

As shown in FIG. 3, in various implementations, the example teleassist-enabled system 300 can include one or more maps 32, respectively or combined to show one or more static objects (a building such as a vehicle inspection station, bridge, lake, road signs, etc.) in an environment (e.g., see an example environment having a highway and a road sign in FIG. 6A) of an autonomous vehicle. The one or more maps 32 can be stored locally or retrieved remotely, and can be utilized to generate a map layout 322 that displays location(s) of the one or more static objects based on a location of the autonomous vehicle.

In various implementations, the example teleassist-enabled system 300 can further include a perception engine 34 to detect, track, and/or identify one or more dynamic objects (e.g., bikes, vehicles, pedestrians, road-blocking barriers, etc., that are movable within the environment) and/or one or more dynamic properties (e.g., colors of traffic lights) of the aforementioned one or more static objects. For example, the perception engine 34 can include a vehicle inspection station engine ("VIS engine") 342 (e.g., local to the autonomous vehicle) to determine whether a vehicle inspection station present within an environment of the autonomous vehicle is active or inactive, where the vehicle inspection station can be shown in the map layout 322. As another example, the perception engine 34 can alternatively or additionally include an inspection completion determination engine ("ICD engine") 344 to determine whether vehicle inspection of the autonomous vehicle at the inspection location and/or the additional inspection location is complete.

Optionally, the VIS engine 342 can process an image depicting a road sign associated with the vehicle inspection station, to determine whether the vehicle inspection station is active ("open") to conduct vehicle inspection, or is inactive ("closed") so that vehicle inspection at this vehicle inspection station is temporarily waived. Such an image depicting the road sign, for instance, can be captured using a camera (e.g., front-facing camera or side camera) disposed on the autonomous vehicle. As a non-limiting example, the road sign associated with the vehicle inspection station can use one or more lighting devices capable of emitting a flashing light, to indicate an operating status of the vehicle inspection station (e.g., with the flashing light indicating the vehicle inspection station being active). In this example, the VIS engine 342 can determine whether the vehicle inspection station is active or inactive, by determining whether the flashing light that indicates an active operating status of the vehicle inspection station is detected from the image capturing the road sign.

As another non-limiting example, the road sign can be an electronic road sign including a display (or other applicable indicator), to indicate an operating status of the vehicle inspection station. For instance, the electronic road sign can include a dot matrix display of lights or a display screen that shows natural language content (e.g., "OPEN" or "CLOSED") or a symbol dynamically changeable to indicate the operating status of the vehicle inspection station. In this example, for instance, the VIS engine 342 can determine whether the vehicle inspection station is active or inactive, by determining whether the electronic road sign that indicates an active operating status of the vehicle inspection station is detected from the image capturing the electronic road sign.

In some implementations, the VIS engine 342 can include or access one or more machine learning models trained to process images (e.g., images capturing one or more road signs), to detect the flashing light (e.g., yellow flashing light) or the display (e.g., "OPEN" or "CLOSED") from a VIS-related road sign that is depicted in the images. Alternatively or additionally, the VIS engine 342 can process an image capturing an entrance to the vehicle inspection station, to determine whether the entrance to the vehicle inspection station is blocked (indicating that the vehicle inspection station is "closed" or "inactive") using one or more road-blocking devices (e.g., cones, barriers, etc.). In some implementations, the VIS engine 342 can include or access one or more machine learning models trained to determine whether an image depicting an entrance to the vehicle inspection station includes one or more road-blocking devices that block the entrance to the vehicle inspection station.

Optionally, the inspection completion determination engine ("ICD engine") 344 can process one or more images (e.g., a plurality of video frames from a live video) to determine whether a clear-to-proceed signal (i.e., that indicate the inspection of the autonomous vehicle is complete) is present in the one or more images. For instance, the clear-to-proceed signal that indicates the inspection of the autonomous vehicle is complete can be an electronic signal indicating that the autonomous vehicle can proceed to exit the vehicle inspection station, a human gesture indicating that the autonomous vehicle is clear to proceed (i.e., exit the vehicle inspection station), or a voice command indicating that the autonomous vehicle is clear to proceed. Alternatively or additionally, during the vehicle inspection of the autonomous vehicle and while the autonomous vehicle is disposed at the inspection location, an inspection barrier may be placed in front of the autonomous vehicle to indicate that the autonomous vehicle is under inspection. In this case, the clear-to-proceed signal can be a removal of the inspection barrier from the front of the autonomous vehicle, instead of or in addition to the aforementioned electronic signal, human gesture, or voice command.

In various implementations, the example teleassist-enabled system 300 can generate a digital map 302 based on the one or more maps 32 and based on the one or more dynamic objects. In some implementations, the digital map 302 can be an inspection-based dynamic map generated for controlling the autonomous vehicle to enter, pause (for inspection), and exit the vehicle inspection station. In this case, the perception engine 34 can be configured to detect selected dynamic objects (e.g., road-blocking barriers, unmapped signs, new pavement or lane markings, patrol officer, police patrol dogs, etc.) surrounding or within the vehicle inspection station. The selected dynamic objects detected by the perception engine 34 can be added to display within the map layout 322, along with static objects such as highway adjacent to the inspection station, and/or mapped road signs, etc. Optionally, for the inspection-based dynamic map, only dynamic objects relating to vehicle inspection station are selected to be detected and/or displayed within the map layout 322. For instance, for the inspection-based dynamic map, dynamic objects such as flying birds may not be displayed within the map layout 322. It's noted that the digital map 302 can be customized in other types or have other particular uses, and dynamic objects selected to be displayed along with static objects in the digital map 302 can depend on a particular type of the digital map 302.

As a non-limiting example, the teleassist-enabled system 300 can generate the digital map 302 by integrating or fusing one or more dynamic objects (e.g., vehicles driving behind and/or aside with the autonomous vehicle, barriers defining a selected lane that leads to the inspection location of the vehicle inspection station, the inspection location, inspection authorities such as police officers, border control agents, or inspection agents, police dogs, etc.) with the map layout 322. The map layout 322, for instance, can depict an environment of the autonomous vehicle that includes the vehicle inspection station, entrance to the vehicle inspection station, and paved road leading to or out of the vehicle inspection station, etc. Accordingly, the digital map 302 not only depicts the aforementioned one or more static objects (e.g., a mapped speed limit road sign at or near an entrance to the vehicle inspection station), but also the one or more dynamic objects (e.g., inspection authorities, barriers placed by the inspection authorities to define a selected lane that leads to the inspection location, etc.), in the environment of the autonomous vehicle that includes the vehicle inspection station. The generated digital map 302 can be consumed by a planner ("planning engine") 36 to generate or plan a driving path for the autonomous vehicle. Accordingly, the digital map 302 can depict a current or live representation of the environment surrounding the autonomous vehicle.

Optionally, referring to FIG. 3, instead of using the aforementioned ICD engine 344 to determine whether the inspection of the autonomous vehicle is complete, the perception engine 34 can transmit, during an established teleassist session, sensor data (e.g., images, videos, audio data, etc.) detected by one or more sensors (e.g., the camera 138 from the primary sensor system 130) to a remote teleassist system 38. As a non-limiting example, the perception engine 34 can further include an autonomous vehicle status determination engine (referred to as "AV status engine" or "AV status determination engine") 346, where the AV status engine 346 can be configured to detect whether the autonomous vehicle is in an inspection mode. In this example, the AV status engine 346 can, in response to detecting that the autonomous vehicle is in the inspection mode, inform a local teleassist component 30 (that is local to the autonomous vehicle) that the autonomous vehicle is in the inspection mode.

In the above example, in response to being informed that the autonomous vehicle is in the inspection mode, the local teleassist component 30 can, at block 302, determine whether a teleassist (TA) session exists between the local teleassist component 30 that is local to the autonomous vehicle and the remote teleassist system 38 that is remote to the autonomous vehicle. If the local teleassist component 30 determines that a teleassist session does not exist between the local teleassist component 30 and the remote teleassist system 38, the local teleassist component 32 can, at block 304, generate or trigger a teleassist request that requests to establish a teleassist session between the local teleassist component 30 and the remote teleassist system 38. Such a teleassist request can be automatically forwarded to the remote teleassist system 38 subsequent to being generated or triggered. The remote teleassist system 38, in response to receiving the teleassist request, can initiate a teleassist session (block 306), to transmit sensor data (e.g., a live video capturing a surrounding environment of the autonomous vehicle that is in the inspection mode, and/or audio piece capturing a voice command from an inspection authority) and/or other information from the local teleassist component 30 of the autonomous vehicle to the remote teleassist system 38.

Optionally, the local teleassist component 30 can determine that there is an existing teleassist session between the local teleassist component 30 and the remote teleassist system 38, so that the local teleassist component 30 can transmit sensor data (e.g., a live video capturing a surrounding environment of the autonomous vehicle that is in the inspection mode, and/or audio piece capturing a voice command from an inspection authority) and/or other information from the autonomous vehicle to the remote teleassist system 38 using the existing teleassist session.

Using the initiated teleassist session or the existing teleassist session, the remote teleassist system 38 can, at block 308, receive the sensor data (e.g., a live video capturing a surrounding environment of the autonomous vehicle that is in the inspection mode, and/or audio piece capturing a voice command from an inspection authority). At block 310, the remote teleassist system 38 can present such sensor data via one or more displays and/or one or more speakers to a teleassist operator that operates the remote teleassist system 38. For instance, the remote teleassist system 38 can display, to the teleassist operator, one or more images (or a live video) showing an inspection authority walking towards the autonomous vehicle or waving his or her hand indicating that the inspection is complete, and/or an electronic signal indicating the inspection is ongoing or is complete. Alternatively or additionally, the remote teleassist system 38 can present to the teleassist operator a live audio capturing a voice command such as "please hold" or "all clear" that instructs whether inspection of the autonomous vehicle is complete.

After inspecting the sensor data, at block 312, the teleassist operator authorized to access or operate the remote teleassist system 38 can provide one or more teleassist operator inputs (sometimes referred to as "remote teleassist operator input") at a user interface (e.g., a graphical user interface, "GUI") of the remote teleassist system 38. The teleassist operator can provide the one or more teleassist operator inputs by selecting a selectable element (e.g., virtual buttons or other selectable GUI elements) displayed at the graphic user interface, where the selectable element can be selected via voice input, mouse clicking, keyboard input, touch input, or other appropriate type of input, of the teleassist operator.

The one or more teleassist operator inputs can be, or can include, a first teleassist operator input that suggests a vehicle control operation to release the autonomous vehicle from the inspection mode. For instance, the first teleassist operator can be a vehicle control operation to turn off a hazard light of the autonomous vehicle, indicating that the autonomous vehicle is released from the inspection mode. In this instance, the first teleassist operator input can be a selection of a virtual button corresponding to an "off" status of the hazard light, based on the presented sensor data which captures one of the aforementioned clear-to-proceed signals.

Alternatively or additionally, the one or more teleassist operator inputs can be, or can include, a second teleassist operator input that suggests controlling the autonomous vehicle to exit the inspection location of the vehicle inspection station.

Before ending the teleassist session, the remote teleassist system 38 can, at block 314, transmit the one or more teleassist operator inputs (e.g., the first teleassist operator input that suggests the vehicle control operation and/or the second teleassist operator input, or alternatively a vehicle control message generated based on the one or more teleassist operator inputs), back to the local teleassist component 30. In this case, the local teleassist component 30 can transmit the one or more teleassist operator inputs (or alternatively the vehicle control message) to the planner 36 to, for instance, update a driving path (e.g., exit the vehicle inspection station or proceed to an additional inspection location for further inspection) planned for the autonomous vehicle. The planner 36 can update the driving path planned for the autonomous vehicle based on: (1) the one or more teleassist operator inputs and/or (2) the digital map 302. Alternatively or additionally, the one or more teleassist operator inputs can be processed or utilized to control aspects of the autonomous vehicle other than a driving path. For instance, the one or more teleassist operator inputs can be utilized to control a hazard light or a speed of the autonomous vehicle.

Optionally, at block 316, the remote teleassist system 38 can end the teleassist session. The remote teleassist system 38 can end the teleassist session in response to the teleassist operator input being transmitted to the local teleassist component 30. Alternatively, the remote teleassist system 38 can end the teleassist session after a predetermined period of time following the transmission of the teleassist operator input to the local teleassist component 30. Alternatively, the remote teleassist system 38 can end the teleassist session in response to receiving an input from the teleassist operator that ends the teleassist session. Alternatively, the remote teleassist system 38 can end the teleassist session in response to receiving a request from the local teleassist component 30 to end the teleassist session.

Figure 4:
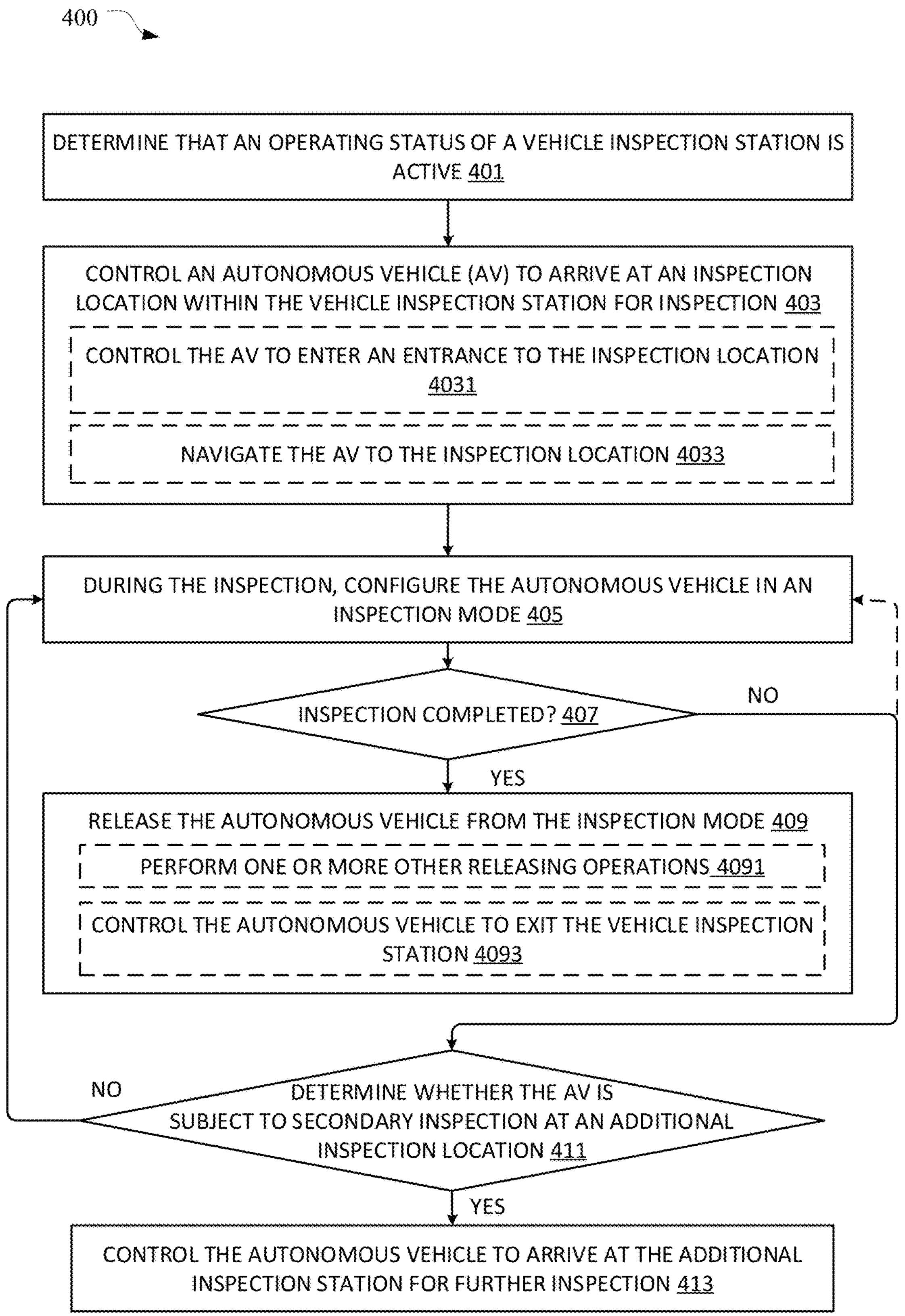
FIG. 4 illustrates an example method of controlling an autonomous vehicle in presence of an active vehicle inspection station, consistent with various implementations.

FIG. 4 illustrates an example method of inspect an autonomous vehicle in presence of an active vehicle inspection station, consistent with various implementations. The operations of the method 400 are described with reference to a system that performs the operations, where for instance the system be, or can include an autonomous vehicle control system (e.g., 202 in FIG. 2A) local to an autonomous vehicle. The autonomous vehicle control system can include one or more processors, one or more memories, and/or other components. While the operations of the method 400 are shown in a particular order, this is not meant to be limiting, and one or more of the operations can be re-ordered, omitted, and/or additional operations can be added.

As shown in FIG. 4, the system (e.g., the autonomous vehicle control system) determines, at block 401, that an operating status of a vehicle inspection station is active. The vehicle inspection station can be, for instance, a weigh station, a border patrol station, or any other applicable type of inspection station. Optionally, the system can locally determine that the operating status of the vehicle inspection station is active, or can determine that the operating status of the vehicle inspection station is active with assistance (e.g., confirmation of the active operating status) from a remote teleassist system that is remote to the system.

At lock 403, the system can, in response to determining that the operating status of the vehicle inspection station is active, control an autonomous vehicle (AV) to arrive at an inspection location within the vehicle inspection station for inspection. For instance, the system can, at block 4031, control the autonomous vehicle to enter an entrance to the vehicle inspection station (or the inspection location of the vehicle inspection station in case there is only one inspection location within the vehicle inspection station). Further in this instance, the system can, at block 4033, navigate the autonomous vehicle to an assigned inspection location within the vehicle inspection station. For instance, the vehicle inspection station can include a plurality of inspection locations (one or more for inspecting trucks, one or more for inspecting regular vehicles, etc.), and after entering the entrance, the autonomous vehicle, when being a truck, can be controlled to select a lane that leads an inspection location, of the plurality of inspection locations, that is assigned to inspect trucks or autonomous trucks.

At block 405, after or in response to the autonomous vehicle arriving at the inspection location for inspection, the system can cause the autonomous vehicle to enter an inspection mode. In some embodiments, in response to the autonomous vehicle entering the inspection mode while being disposed at the inspection location for inspection, the system can turn on or activate a hazard light of the autonomous vehicle to indicate that the autonomous vehicle is in the inspection mode. Alternatively or additionally, when in the inspection mode, the autonomous vehicle can be controlled to unlock one or more vehicle doors, lower one or more vehicle windows, and/or turn off the engine, in addition to having the hazard light on. Optionally, the inspection mode can be a "hold" mode in which autonomous driving functions of the autonomous vehicle are disabled, where the autonomous driving functions of the autonomous vehicle can be disabled until a releasing message or signal is received from the remote teleassist system. The releasing message or signal, for instance, can be generated based on an input from a teleassist operator that confirms that the autonomous vehicle can be released to have the autonomous driving functions back on.

At block 407, the system can determine whether the inspection is complete. In some implementations, the system can receive assistance from the remote teleassist system to determine whether the inspection is complete. For instance, the system can transmit sensor data (e.g. continuously) that captures a surrounding environment of the autonomous vehicle which is in the inspection mode for inspection, to the remote teleassist system. In this instance, the system can receive a teleassist operator input (or a message generated based on the teleassist operator input) from a teleassist operator, where the teleassist operator input indicates that the inspection is complete so that the autonomous vehicle can be released from the inspection mode. The teleassist operator input indicating that the inspection is complete can be generated or received based on the sensor data capturing any of the aforementioned clear-to-proceed signals. In some other implementations, the teleassist operator may be available for communication with an inspector (e.g., a patrol officer) through video, audio or other communication methods. For example, a display may be apparent to the inspector showing the teleassist operator with a written statement indicating communication is available.

If the system determines that the inspection is complete at block 407, operations can proceed to block 409 where the system releases the autonomous vehicle from the inspection mode. For instance, the system can, at block 4091, perform one or more releasing operations. As a non-limiting example, the one or more releasing operations can include: turning off the hazard light of the autonomous vehicle, to indicate that the inspection of the autonomous vehicle is complete. Alternatively or additionally, the one or more releasing operations can include: raising the one or more vehicle windows that were previously lowered during inspection, locking the one or more vehicle doors that were previously unlocked during inspection, or turning on the engine of the autonomous vehicle that was previously shut down during inspection, etc. At block 4093, the system can further control the autonomous vehicle to exit the vehicle inspection station. For instance, the autonomous vehicle can be controlled to follow a driving path determined based on the aforementioned digital map 302 that is generated based on the environment of the autonomous vehicle. Alternatively or additionally, the autonomous vehicle can be controlled to exit the vehicle inspection station, based on one or more teleassist operator inputs that recommend one or more operations for the autonomous vehicle to exit the vehicle inspection station.

In some implementations, as indicated by the dashed arrow in FIG. 4, if the system determines that the inspection is not complete at block 407, operations can return back to block 405 where the system controls (or continues to control) the autonomous vehicle in the inspection mode. Alternatively or additionally, operations can proceed to block 411 where the system determines whether the AV is subject to secondary inspection ("further inspection") at an additional inspection location that is different from the aforementioned inspection location. In this case, if the system determines that the AV is subject to secondary inspection at the additional inspection location, the system can control the autonomous vehicle to arrive at the additional inspection location (block 413). If the system determines that the AV is not subject to secondary inspection at the additional inspection location, operations can return back to block 405 where the system controls (e.g., continues controlling) the autonomous vehicle in the inspection mode.

Optionally, in some implementations, the system can determine whether the AV is subject to secondary inspection at the additional inspection location based on whether a secondary inspection signal is detected. For instance, the secondary inspection signal can be an electronic signal indicating that the autonomous vehicle needs further inspection, a human gesture indicating that the autonomous vehicle needs further inspection, or a voice command indicating that the autonomous vehicle needs further inspection.

Optionally, the system can determine whether the AV is subject to secondary inspection at the additional inspection location, with assistance from the remote teleassist system. For instance, the system can transmit sensor data monitoring a surrounding environment of the autonomous vehicle to the remote teleassist system, and receive a teleassist operator input indicating whether the AV is subject to secondary inspection at the additional inspection location. In this instance, the teleassist operator input indicating whether the AV is subject to secondary inspection at the additional inspection location can be generated based on whether the sensor data presented to the teleassist operator that provides the teleassist operator input captures any of the aforementioned secondary inspection signals.

Optionally, in some implementations, the sensor data transmitted to the remote teleassist system and the corresponding teleassist operator input indicating whether the AV is subject to secondary inspection can be used to generate a training instance to train a machine learning model in determining whether a vehicle (e.g., the autonomous vehicle) is subject to secondary inspection. For instance, the machine learning model to determine whether a vehicle is subject to secondary inspection can be trained using the sensor data transmitted to the remote teleassist system as input, to generate a corresponding output. In this instance, the corresponding output can be compared with the corresponding teleassist operator input indicating whether the AV is subject to secondary inspection, to determine a difference, where based on the determined difference, one or more weights of the machine learning model (i.e., to determine whether a vehicle is subject to secondary inspection) can be adjusted.

It's noted that while not described previously, sensor data transmitted to the teleassist system (i.e., remote teleassist system) capturing one or more road signs associated with a vehicle inspection station (and/or an entrance to the vehicle inspection station with or without road-blocking devices), along with a corresponding teleassist operator input that suggests or confirms whether the vehicle inspection station is active or inactive, can also be used to generate a training instance to train a machine learning model that aims to determine whether the vehicle inspection station is active. Similarly, sensor data transmitted to the teleassist system capturing an environment of the autonomous vehicle at vehicle inspection station during inspection, along with a corresponding teleassist operator input that suggests or confirms whether the inspection is complete at the inspection location (or inspection spot), can be applied to generate a training instance, to train a machine learning model that aims to determine whether inspection is complete. The different machine learning models described herein can be trained using one or more training instances that are generated correspondingly, using the approach described in the above instance. Repeated descriptions are omitted herein for conciseness.

Figure 5A:
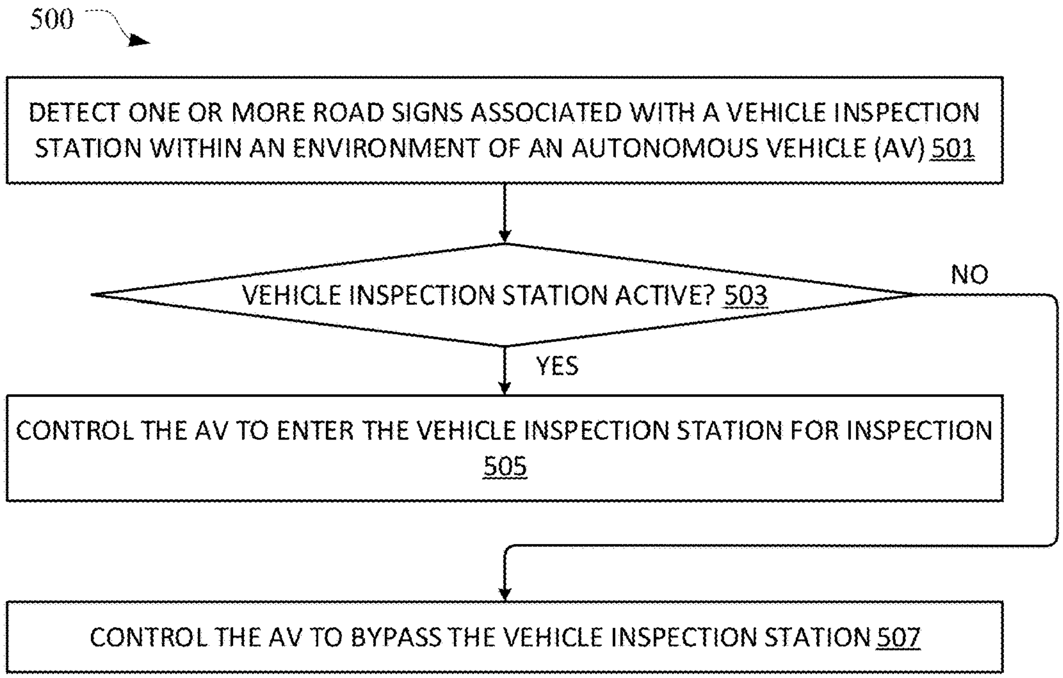
FIG. 5A and FIG. 5B illustrate an example method of determining whether a vehicle inspection station within an environment of an autonomous vehicle is active and therefore controlling the autonomous vehicle accordingly.
Figure 5B:
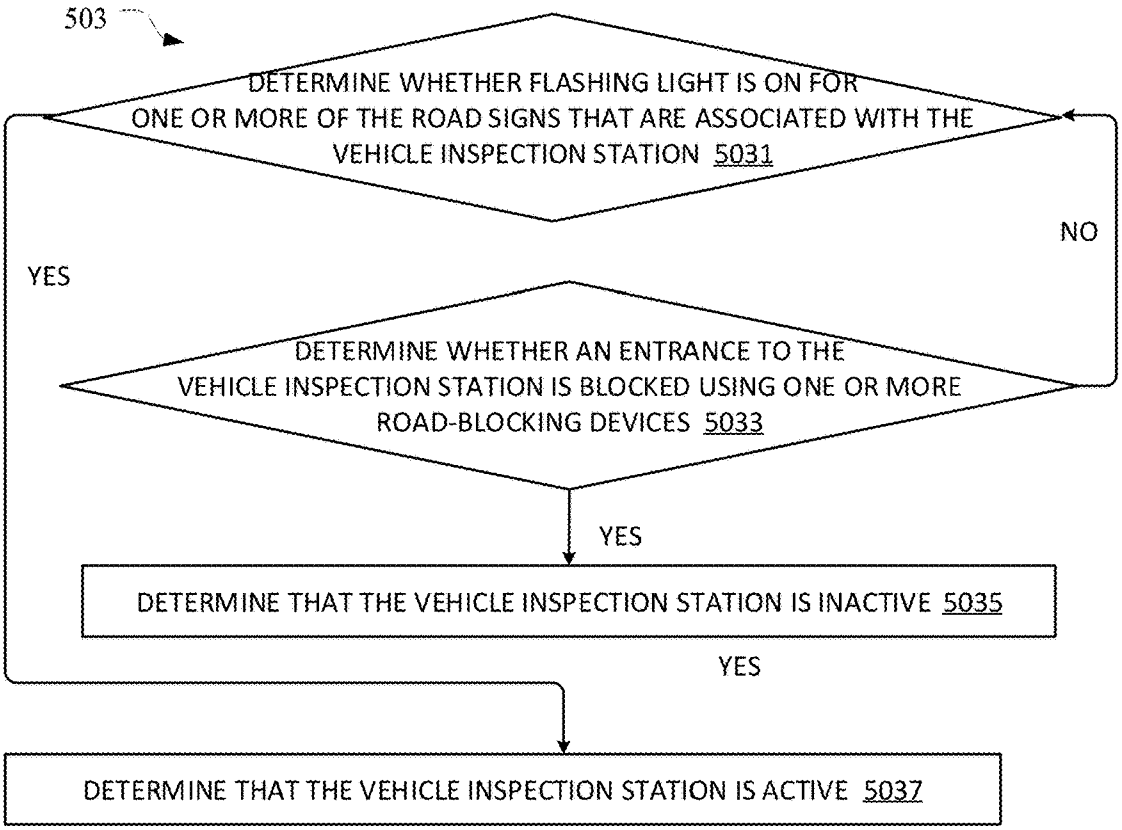

FIG. 5A and FIG. 5B illustrate example methods of determining whether a vehicle inspection station within an environment of an autonomous vehicle is active and therefore controlling the autonomous vehicle accordingly. The operations of the method 500 are described with reference to a system that performs the operations, where the system may be, or can include an autonomous vehicle control system (e.g., 202 in FIG. 2A) local to an autonomous vehicle. The autonomous vehicle control system can include one or more processors, one or more memories, and/or other components. While the operations of the method 500 are shown in a particular order, this is not meant to be limiting, and one or more of the operations can be re-ordered, omitted, and/or additional operations can be added.

As shown in FIG. 5A, at block 501, the system can detect one or more road signs (see FIG. 6A, 6B, 6C, or 6D which are described below as an example) associated with a vehicle inspection station within an environment of an autonomous vehicle. The vehicle inspection station, for instance, can be a patrol border station that inspects vehicles for security or other concerns. The vehicle inspection station can also be a weigh station that inspects vehicles to determine whether a vehicle conforms to a predefined weight limit for the vehicle.

At block 503, the system can determine whether the vehicle inspection station indicated by the one or more road signs is active or inactive. For instance, the system can determine whether the vehicle inspection station is active by determining whether a flashing light of the one or more road signs flashes. As another instance, the system can determine whether the vehicle inspection station is active by determining whether an electronic road sign displaying natural language content (e.g., "OPEN" or "CLOSED") or a symbol dynamically changeable to indicate the operating status of the vehicle inspection is detected.

Alternatively, the system can determine (e.g., using the aforementioned perception engine/system of the autonomous vehicle control system) whether the vehicle inspection station is active by further determining whether an entrance to the vehicle inspection station is blocked (e.g., using one or more road-blocking devices), or is free of obstructions. Alternatively, the system can determine whether the vehicle inspection station is active by further receiving a teleassist operator input determined based on sensor data indicating whether flashing light and/or road-blocking devices exist. The teleassist operator input can alternatively or additionally be determined based on a call or message to the vehicle inspection station that confirms whether or not the vehicle inspection station is active.

At block 505, in response to determining that the vehicle inspection station is active, the system can control the autonomous vehicle to enter the vehicle inspection station for inspection. For instance, the autonomous vehicle can be controlled to enter an entrance to the vehicle inspection station. Optionally, after entering the entrance to the vehicle inspection station, the autonomous vehicle can be further controlled to adjust its driving speed based on one or more road signs each indicating a corresponding speed limit. Optionally, after entering the entrance to the vehicle inspection station, the autonomous vehicle can be controlled to select a lane, of one or more lanes that respectively lead to an inspection spot (e.g., 803 and 805 in FIG. 8B) of an inspection location (e.g., 82 in FIG. 8B). The teleassist system may (or may not) provide teleassist operator input that suggests the lane that leads the autonomous vehicle to an inspection spot that is defined (or that is appropriate) for the autonomous vehicle. Optionally, after entering the entrance to the vehicle inspection station, the autonomous vehicle can be controlled to pause at a queue of vehicles that are waiting to be inspected. Examples or scenarios described herein are not intended to be limiting and are for the purpose of illustration.

At block 507, in response to determining that the vehicle inspection station is inactive, the system can control the autonomous vehicle to bypass the vehicle inspection station (e.g., to drive along a current lane and at a current speed) without entering and being inspected at the vehicle inspection station.

As a non-limiting example, to determine whether the vehicle inspection station (the presence of which is indicated by the one or more road signs) is active or inactive (block 503), the system can determine whether a flashing light is detected from one or more images that capture the one or more road signs associated with the vehicle inspection station (block 5031). The system can determine that the vehicle inspection station is active if the flashing light is detected from the one or more images that capture the one or more road signs associated with the vehicle inspection station. It's noted that the one or more images here can be collected via one or more image-capturing sensors (e.g., camera) disposed on the autonomous vehicle. Optionally, the system can determine that the vehicle inspection station is inactive if no flashing light is detected from the one or more images that capture the one or more road signs associated with the vehicle inspection station.

Alternatively or additionally, referring to FIG. 5B, the system can determine whether an entrance to the vehicle inspection station is blocked, e.g., using one or more road-blocking devices such as barriers (block 5033). If the system determines that the entrance to the vehicle inspection station is blocked using the one or more road-blocking devices, the system can determine that the vehicle inspection station is inactive (block 5035). Optionally, if the system determines that the entrance to the vehicle inspection station is not blocked, the system can retrieve sensor data that depicts the aforementioned one or more road signs associated with the vehicle inspection station, for instance, from a memory of the autonomous vehicle that stores such sensor data. In this case, if the system determines that flashing light is detected from the one or more road signs (in addition to determining that the entrance to the vehicle inspection station is not blocked), the system can determine that the vehicle inspection station is active (block 5037).

FIG. 6A, FIG. 6B, FIG. 6C, and FIG. 6D respectively illustrate non-limiting examples of one or more road signs an autonomous vehicle may encounter in an environment having a vehicle inspection station, consistent with various implementations of this disclosure. As shown in FIG. 6A, an autonomous vehicle 602 can drive along a highway in a direction D1, and one or more sensors (e.g., a right-side camera) of the autonomous vehicle 602 can detect a first road sign 603 indicating that there is an inspection station approximately 2 miles away from the autonomous vehicle 602. Optionally, the first road sign 603 can further indicate that a speed limit of 55 mph becomes effective and is applicable to the autonomous vehicle 602, when light 6031 flashes.

Figure 6B:
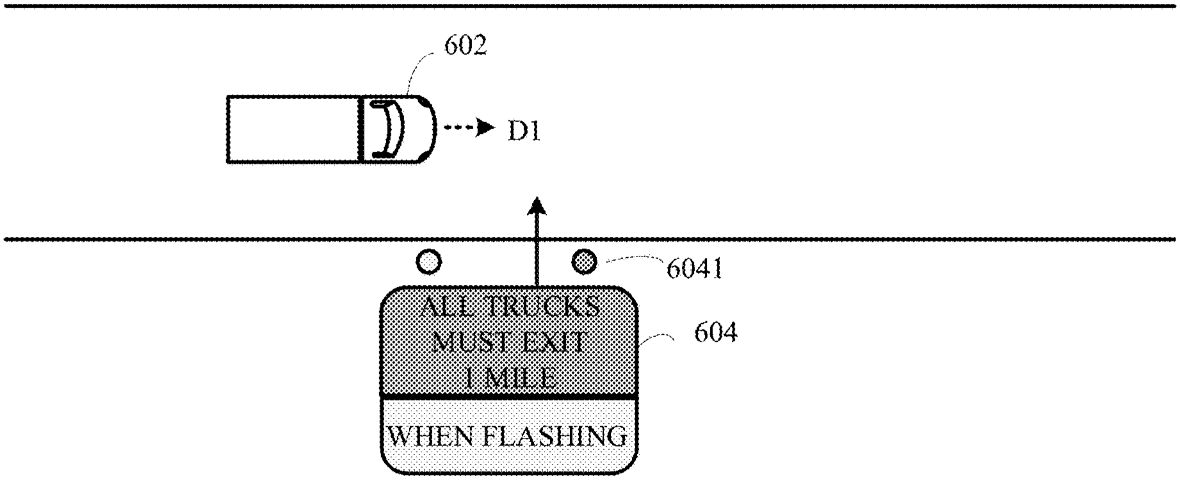

Referring to FIG. 6B, the autonomous vehicle 602 can, via the one or more sensors, detect a second road sign 605 indicating that an entrance to the vehicle inspection station is approximately 1 mile away. Optionally, the second road sign 604 can further indicate that a vehicle type (e.g., truck) that is subject to inspection at the vehicle inspection station, where vehicles (including the autonomous vehicle 602) belonging to such vehicle type are required to exit the highway to enter the entrance to the vehicle inspection station, when light 6041 flashes.

Figure 6C:
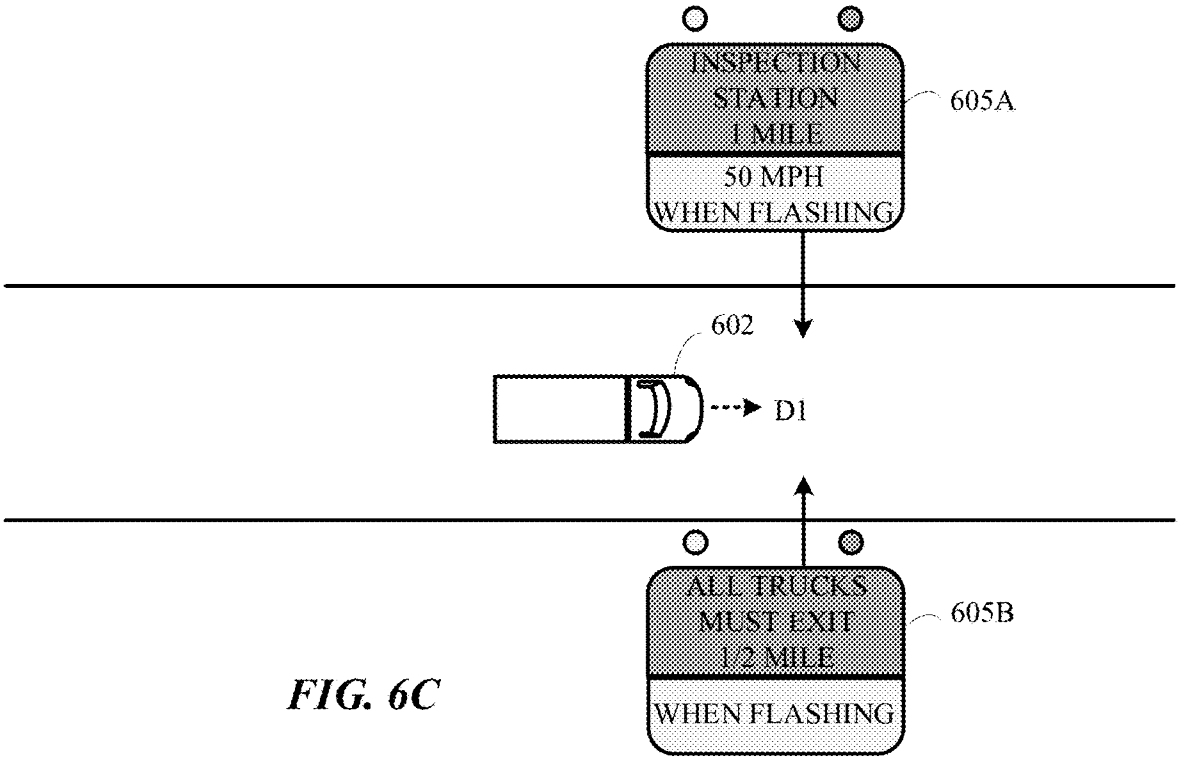

Referring to FIG. 6C, the autonomous vehicle 602 can, via the one or more sensors, detect one or more third road signs 605A and 605B, that are associated with the vehicle inspection station. For instance, the third road sign 605A can indicate that the vehicle inspection station is approximately 1 mile away, ahead of the autonomous vehicle. Optionally, the third road sign 605A can further indicate that a speed limit of 50 mph is exerted when the light flashes. For instance, the third road sign 605B can indicate that all trucks must enter the entrance to the vehicle inspection station when the light flashes, where the entrance to the vehicle inspection station is approximately ½ mile away.

Figure 6D:
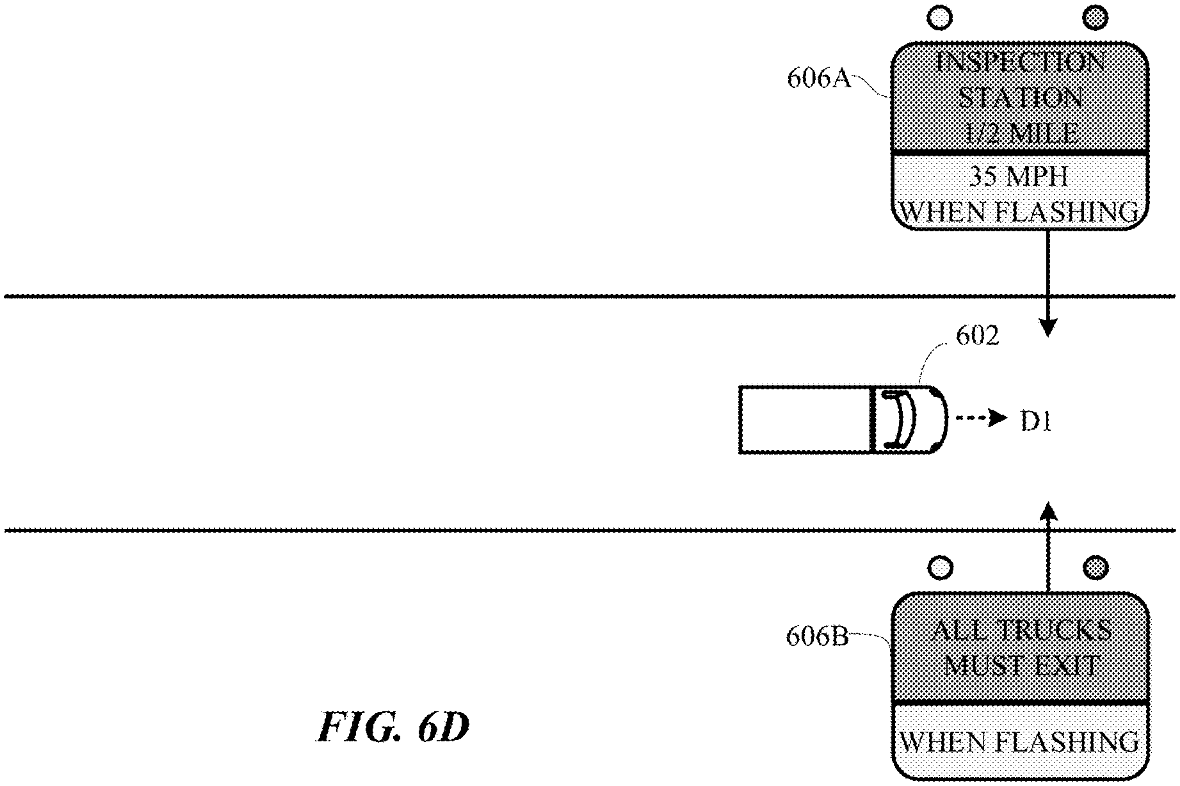

Referring to FIG. 6D, the autonomous vehicle 602 can, via the one or more sensors, detect one or more fourth road signs 606A and 606B. For instance, the fourth road sign 606A can indicate that the vehicle inspection station is approximately ½ mile away, ahead of the autonomous vehicle. In this instance, the third road sign 605A can further indicate that a speed limit of 35 mph is exerted when the light flashes. For instance, the fourth road sign 606B can indicate that the entrance to the vehicle inspection station is right at the corner, and all trucks are required to enter the entrance when the light flashes.

Figure 7A:
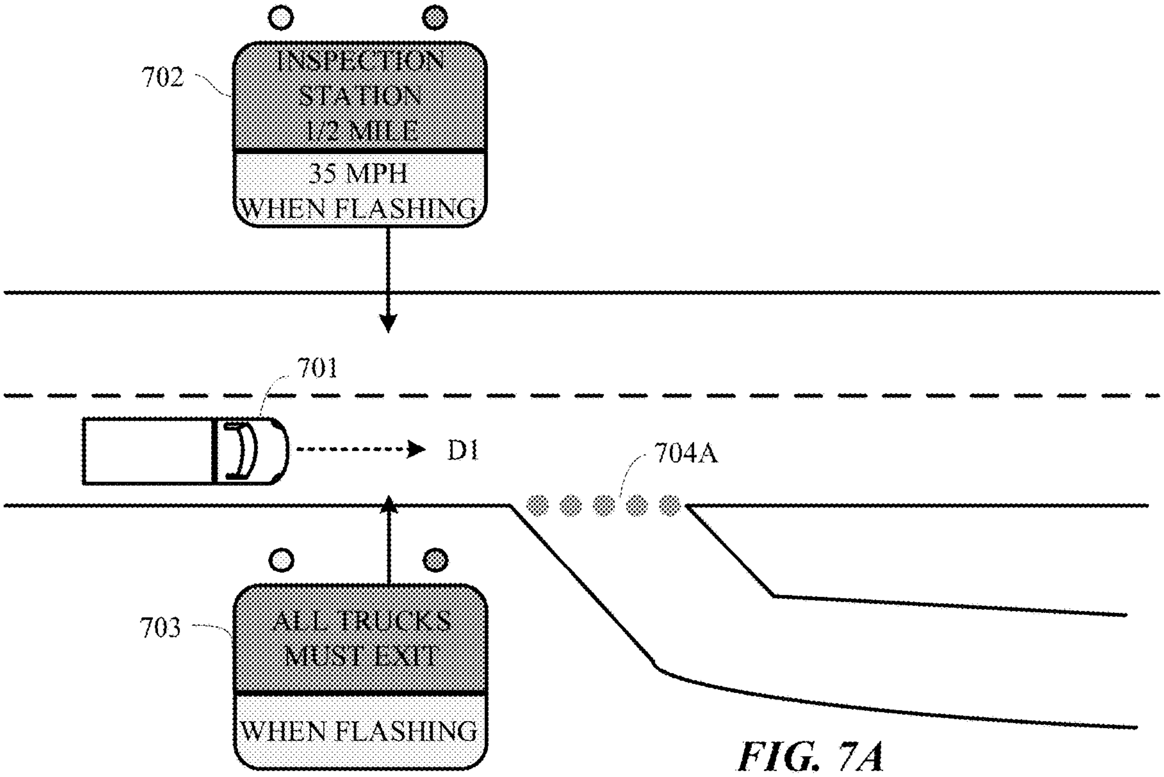
FIG. 7A and FIG. 7B respectively illustrate an example orientation of road-blocking devices that block an entrance to a vehicle inspection station, consistent with various implementations.
Figure 7B:
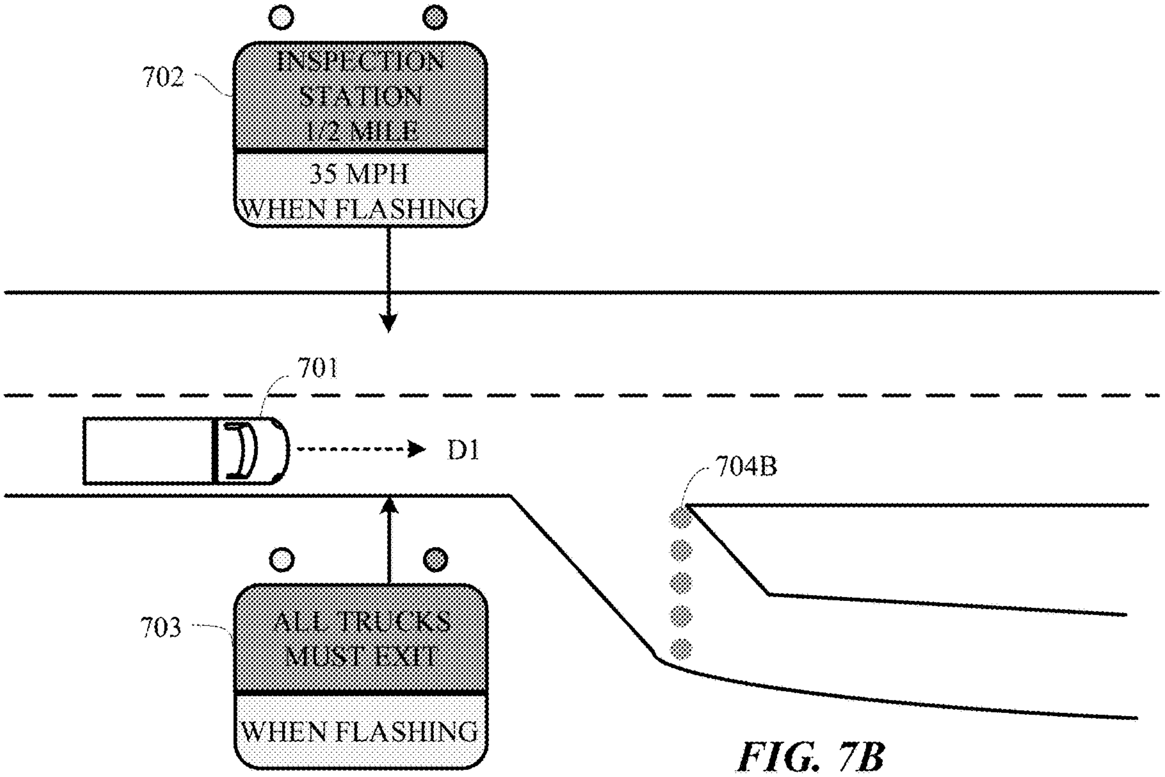

FIGS. 7A and 7B illustrate example orientation of road-blocking devices that block an entrance to a vehicle inspection station, consistent with various implementations. As shown in FIG. 7A, an autonomous vehicle (i.e., autonomous truck) 701 can be driving along a highway in a direction D1 and can encounter a road sign 702 and a road sign 703, where the road sign 702 indicates that an vehicle inspection station is ½ mile away and the road sign 703 provides a flashing light indicating that all trucks must exit the highway to enter the entrance to the vehicle inspection station. In this example, the road sign 702 can also flash to indicate that a speed limit of 35 mph is enforceable. In this example, a side camera of the autonomous vehicle 701 can further detect one or more road-blocking devices 704A arranged approximately parallel to the direction D1 at the entrance to the vehicle inspection station. In the scenario of FIG. 7A, even if the light of the road sign 702 or 703 flashes, the autonomous vehicle 701 can determine that the vehicle inspection station is inactive based on the detection of the one or more road-blocking devices 704A that block the entrance to the vehicle inspection station. While the one or more road-blocking devices 704A are illustrated in FIG. 7A as being arranged approximately parallel to the direction D1 at the entrance to the vehicle inspection station, one or more road-blocking devices 704B can be arranged orthogonally or at an angle with respect to the driving direction D1 of the autonomous vehicle 701 (see FIG. 7B).

Figure 8A:
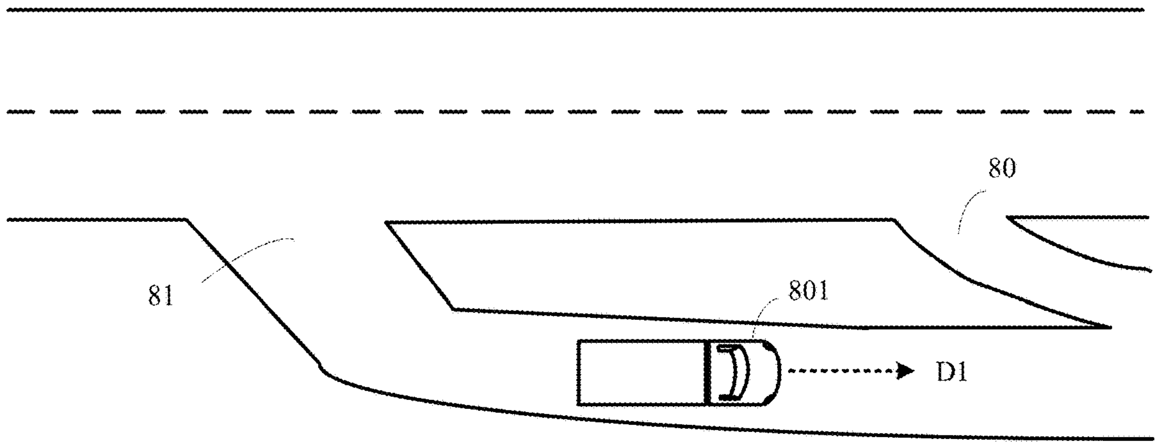
FIG. 8A, FIG. 8B, and FIG. 8C together illustrate an example of an autonomous vehicle entering and being inspected at an inspection station, as well as an additional inspection station, consistent with various implementations.
Figure 8B:
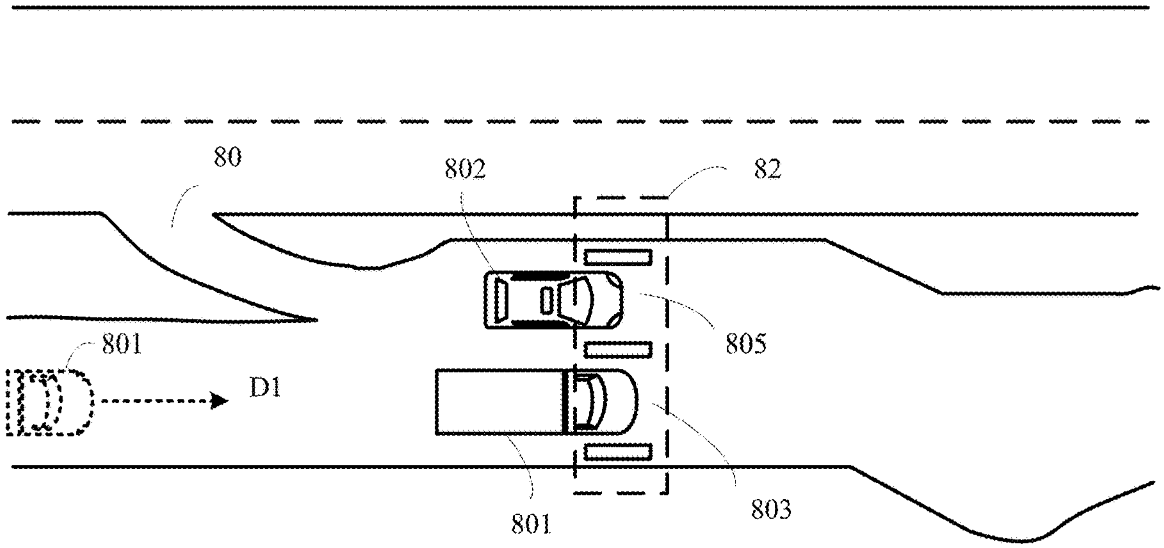
Figure 8C:
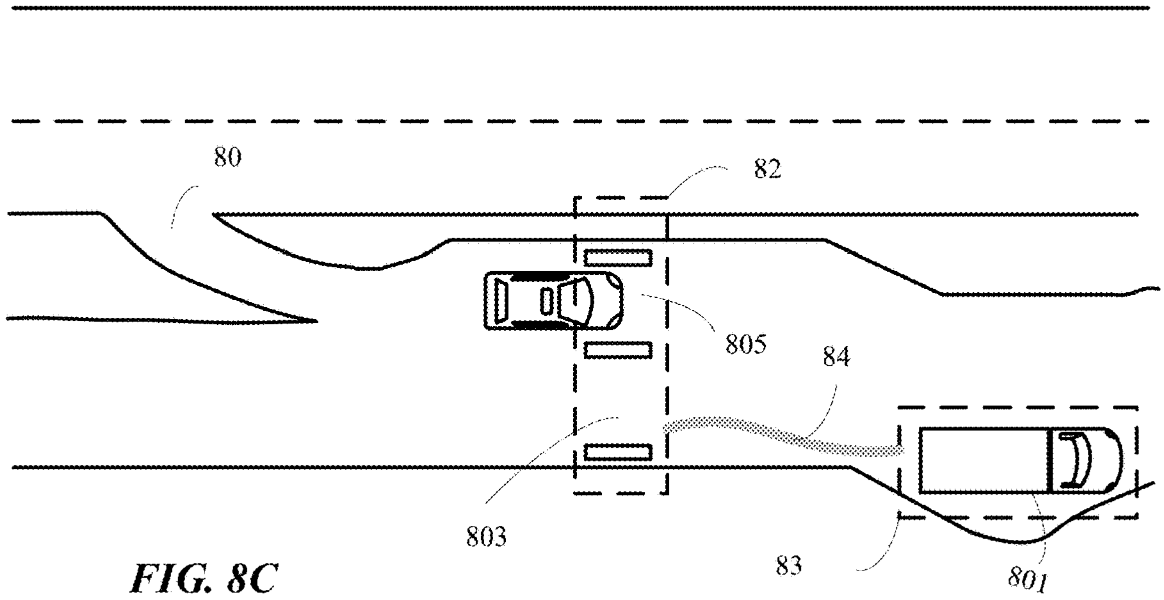

FIGS. 8A, 8B, and 8C together illustrate an example of an autonomous vehicle (e.g., an autonomous truck 801) entering and being inspected at an inspection station, as well as an additional secondary inspection station, consistent with various implementations. As shown in FIG. 8A, the autonomous truck 801 can enter a truck entrance 81 that leads to an inspection location 82 of a vehicle inspection station (not shown in FIG. 8A) and can drive in a direction D1, while a regular vehicle can enter a regular vehicle entrance 80 to the vehicle inspection station.

Referring to FIG. 8B, the autonomous truck 801 can continue driving along the direction D1 (or may need to change its driving direction, speed, and/or path) to arrive at an inspection location 82 (e.g., a first inspection spot 803 of the inspection location 82) for inspection. In this case, a regular vehicle 802 may be configured at a second inspection spot 805 (adjacent to the first inspection spot 803) of the inspection location 82, and the autonomous truck 801 can enter an inspection mode for inspection. When the autonomous truck 801 is placed in the inspection mode, the autonomous truck 801 can turn on or activate a hazard light indicating that the autonomous truck 801 is being inspected. Alternatively or additionally, in the inspection mode, the autonomous truck 801 can (or, be caused to) lower one or more vehicle windows, unlock one or more vehicle doors, turn off an engine of the autonomous truck 801, and/or perform other operations to indicate or facilitate vehicle inspection.

In some implementations, referring to FIG. 8C, the autonomous truck 801 can be required for further inspection, and in response, the autonomous truck 801 can be controlled to leave the inspection spot 803 (or the inspection location 82) for an additional inspection location 83, for further inspection. For instance, the autonomous truck 801 (with or without assistance from a teleassist system) can detect, via one or more sensors that are utilized to monitor a surrounding environment of the autonomous truck 801, a secondary inspection signal. The secondary inspection signal can be, for instance, an electronic signal indicating that the autonomous vehicle needs further inspection, a human gesture indicating that the autonomous vehicle needs further inspection, a voice command indicating that the autonomous vehicle needs further inspection, or other applicable signals. In response to detecting such a secondary inspection signal, the autonomous truck 801 can be controlled to leave the inspection location 82, drive along a road 84 that leads to the additional inspection location 83, and arrive at the additional inspection location 83 for secondary/further inspection.

Figure 9A:
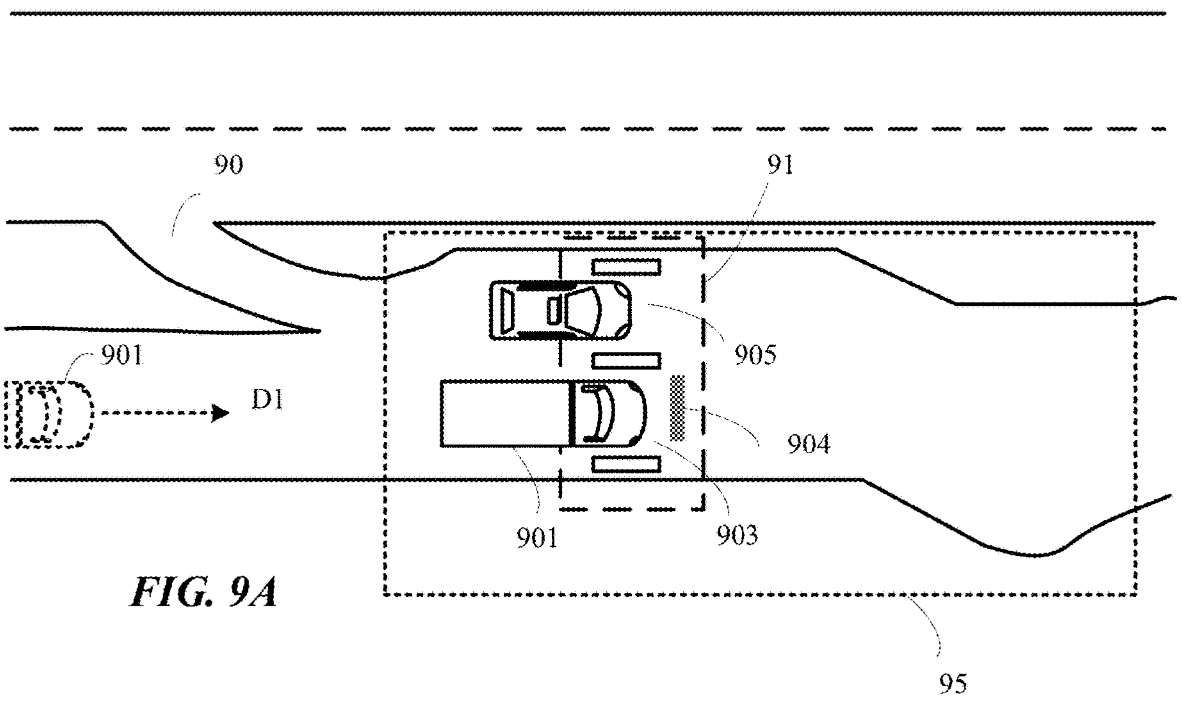
FIG. 9A and FIG. 9B illustrate an example of an autonomous vehicle entering and leaving an inspection station, consistent with various implementations.
Figure 9B:
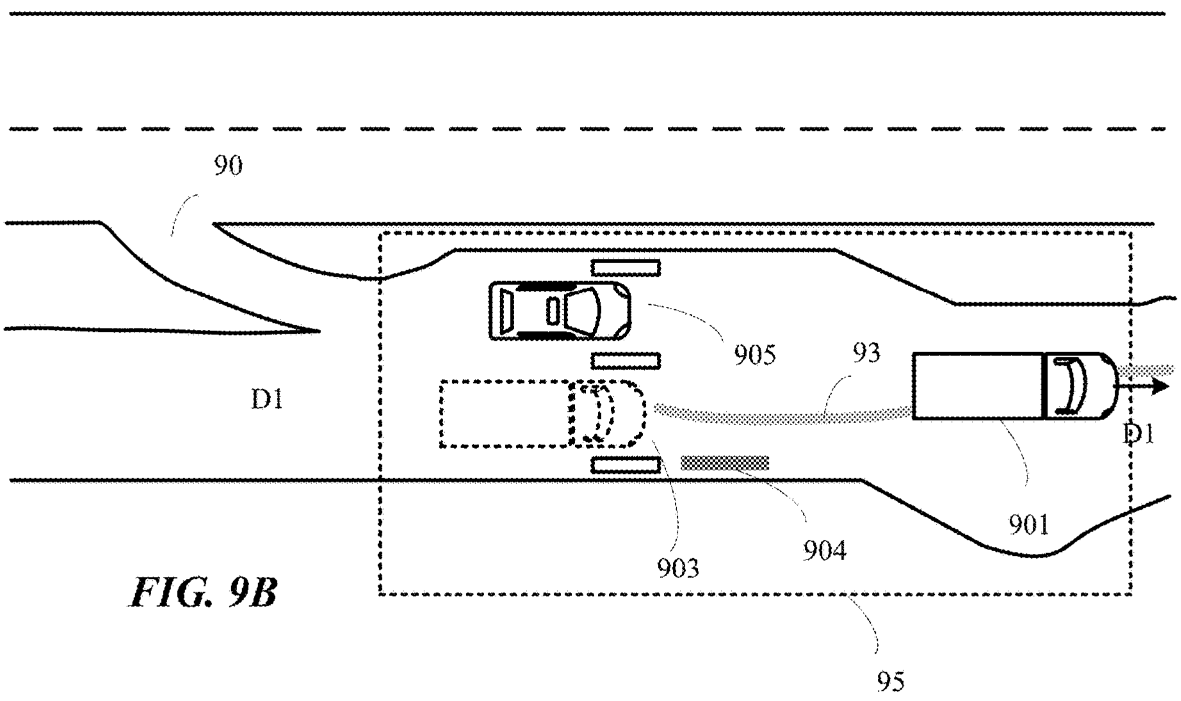

FIGS. 9A and 9B illustrate an example of an autonomous vehicle entering and leaving a vehicle inspection station 95, consistent with various implementations. As shown in FIG. 9A, an autonomous truck 901 can be controlled to drive along a direction D1 to arrive at a first inspection spot 903 within an inspection location 91, where a regular vehicle can enter a regular vehicle entrance 90 to arrive at a second inspection spot 905 that is next to the first inspection spot 903. In this example, a barrier 904 can be placed in front of the autonomous truck 901 to inform the autonomous truck 901 that the autonomous truck 901 is under inspection, and during the inspection, the autonomous truck 901 can be in an inspection mode as described above, or elsewhere in this disclosure. In some implementations, the barrier 904 may have a distinct visual appearance (e.g., based upon a distinctive size, shape, color, pattern, text, and/or graphics) such that the presence or absence of the barrier in front of the autonomous vehicle may be understood by the autonomous vehicle as a positive indicator of whether or not the inspection is complete. Thus, for example, detected removal of the barrier from the front of the autonomous vehicle may be considered to be a positive indication from the inspection authority that the inspection is complete.

Referring to FIG. 9B, the barrier 904 can be removed from the front of the autonomous truck 901 to inform the autonomous truck 901 that the inspection is complete. In response to determining that the barrier 904 is removed from the front of the autonomous truck 901, the autonomous truck 901 can be released from the inspection mode. Optionally, the autonomous truck 901 can be further controlled to drive along a planned path 93 to exit the vehicle inspection station 95.

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another. Other variations will be apparent to those of ordinary skill. For example, various components of the aforementioned autonomous vehicle control system of an autonomous vehicle may be implemented using one or more trained machine learning models. For instance, the aforementioned VIS engine, ICD engine, and/or AV status engine can respectively include a machine learning model trained to detect a target object (e.g., flashing light, road-blocking devices, clear-to-proceed signal, secondary inspection signal, etc.) based on processing one or more images (and/or audio data) captured by one or more sensors (e.g., camera, acoustic sensor, etc.) of the autonomous vehicle.

What is claimed is:

1. An autonomous vehicle control system for controlling an autonomous vehicle in an environment that includes a vehicle inspection station, the autonomous vehicle control system comprising:
- one or more processors; and
- memory storing instructions that, when executed by the one or more processors, cause the autonomous vehicle control system to perform a plurality of operations comprising:
  - determining that an operating status of the vehicle inspection station is active;
  - in response to determining that the operating status of the vehicle inspection station is active, controlling the autonomous vehicle to navigate to an inspection location of the vehicle inspection station;
  - causing the autonomous vehicle to enter an inspection mode at the inspection location, for inspection of the autonomous vehicle;
  - holding the autonomous vehicle at the inspection location;
  - activating a hazard light of the autonomous vehicle to indicate that the autonomous vehicle is in the inspection mode for inspection;
  - determining whether the inspection of the autonomous vehicle is complete; and
  - in response to determining that the inspection of the autonomous vehicle is complete, turning off the hazard light of the autonomous vehicle to indicate that the autonomous vehicle is about to move, releasing the autonomous vehicle from the inspection mode, and controlling the autonomous vehicle to exit the vehicle inspection station.

2. The system of claim 1, wherein determining that the operating status of the vehicle inspection station is active comprises:
- determining, by a perception system of the autonomous vehicle control system, that an entrance to the vehicle inspection station is free of obstructions.

3. The system of claim 1, wherein determining whether the inspection of the autonomous vehicle is complete comprises:
- determining, by a perception system of the autonomous vehicle control system and while the autonomous vehicle is disposed at the inspection location, that one or more clear-to-proceed signals indicate the inspection of the autonomous vehicle is complete.

4. The system of claim 3, wherein the one or more clear-to-proceed signals that indicate the inspection of the autonomous vehicle is complete include: an electronic signal clearing the autonomous vehicle to proceed out of the vehicle inspection station, a human gesture indicating that the autonomous vehicle is clear to proceed, a voice command indicating that the autonomous vehicle is clear to proceed, or a removal of a barrier that is placed in front of the autonomous vehicle during the inspection.

5. The system of claim 3, wherein the one or more processors are further configured to:
- determine that the autonomous vehicle is subject to further inspection at an additional inspection location, in response to detecting a secondary inspection signal indicating a requirement of the further inspection.

6. The system of claim 5, wherein the one or more processors are further configured to: control the autonomous vehicle to arrive at the additional inspection location.

7. The system of claim 5, wherein the secondary inspection signal is an electronic signal indicating that the autonomous vehicle needs further inspection, a human gesture indicating that the autonomous vehicle needs further inspection, or a voice command indicating that the autonomous vehicle needs further inspection.

8. The system of claim 1, wherein the one or more processors are further configured to:
- prior to the autonomous vehicle arriving at the inspection location, initiate a teleassist session between the autonomous vehicle control system and a remote teleassist system.

9. The system of claim 8, wherein the one or more processors are further configured to:
- during the teleassist session:
  - transmit sensor data capturing one or more signals from the vehicle inspection station, to the remote teleassist system, and
  - receive remote teleassist operator input that recommends releasing the autonomous vehicle from the inspection mode in response to detecting a clear-to-proceed signal from the one or more signals.

10. The system of claim 8, wherein the one or more processors are further configured to initiate the teleassist session in response to detection of a road sign that indicates a presence of the vehicle inspection station within the environment of the autonomous vehicle.

11. The system of claim 10, wherein the one or more processors are further configured to determine an effectuated speed limit in response to detection of the road sign and control the autonomous vehicle to conform with the effectuated speed limit.

12. The system of claim 10, wherein the one or more processors are further configured to:
- transmit, during the teleassist session, sensor data capturing the road sign that indicates an effectuated speed limit to the remote teleassist system,
- receive, during the teleassist session, remote teleassist operator input that recommends adjusting a speed of the autonomous vehicle to conform with the effectuated speed limit, and
- control the speed of the autonomous vehicle to conform with the effectuated speed limit in response to receiving the remote teleassist operator input that recommends adjusting the speed of the autonomous vehicle to conform with the effectuated speed limit.

13. The system of claim 1, wherein the one or more processors are configured to:
- detect, via one or more sensors, one or more road signs that indicate a presence of the vehicle inspection station in the environment.

14. The system of claim 13, wherein the one or more processors are configured to determine that the operating status of the vehicle inspection station is active in response to detecting one or more flashing lights detected proximate to the one or more road signs, wherein the one or more flashing lights indicate that the vehicle inspection station is active.

15. The system of claim 13, wherein the one or more road signs include at least one road sign that indicates a speed limit that becomes effective when a light is flashing.

16. The system of claim 15, wherein the one or more processors are further configured to control a speed of the autonomous vehicle to conform with the speed limit which becomes effective in response to the one or more sensors detecting the one or more flashing lights.

17. The system of claim 13, wherein the one or more road signs include at least one road sign that indicates a vehicle type subject to the inspection at the vehicle inspection station.

18. The system of claim 17, wherein one or more of the processors are further configured to determine whether the autonomous vehicle belongs to the vehicle type subject to vehicle inspection at the vehicle inspection station.

19. The system of claim 13, wherein the one or more sensors include:

at least one front-facing sensor configured to monitor the environment for any road-blocking device placed along a substantially orthogonal direction with respect to a driving direction of the autonomous vehicle, and at least one side-facing sensor configured to monitor the environment for any road-blocking device placed along a substantially parallel direction with respect to the driving direction of the autonomous vehicle.

20. The system of claim 1, wherein the vehicle inspection station is a weigh station or a border patrol station.

21. The system of claim 1, wherein the one or more processors are further configured to control the autonomous vehicle to arrive at an inspection location of the vehicle inspection station by: controlling the autonomous vehicle to enter an entrance to the vehicle inspection station and to navigate the autonomous vehicle to the inspection location.

22. The system of claim 21, wherein the one or more processors are further configured to control the autonomous vehicle to navigate the autonomous vehicle to the inspection location by: controlling the autonomous vehicle to drive along a selected lane that leads to the inspection location.

23. The system of claim 22, wherein the one or more processors are further configured to determine the selected lane based on one or more images, captured by one or more image-capturing sensors of the one or more sensors, that include one or more digital signs or one or more physical objects placed on a ground, that define one or more lanes that include the selected lane.

24. A computer-implemented method, comprising:

determining that an operating status of a vehicle inspection station is active;

in response to determining that the operating status of the vehicle inspection station is active, automatically initiating a teleassist session between an autonomous vehicle control system of an autonomous vehicle and a remote teleassist system;

in response to determining that the operating status of the vehicle inspection station is active, controlling the autonomous vehicle to arrive at an inspection location of the vehicle inspection station, for inspection of the autonomous vehicle;

causing the autonomous vehicle to enter an inspection mode at the inspection location, for inspection of the autonomous vehicle;

determining whether the inspection of the autonomous vehicle is complete; and in response to determining that the inspection of the autonomous vehicle is complete, releasing the autonomous vehicle from the inspection mode and controlling the autonomous vehicle to exit the vehicle inspection station.

25. A computer-implemented method, comprising:

determining that an operating status of a vehicle inspection station is active;

in response to determining that the operating status of the vehicle inspection station is active, controlling an autonomous vehicle to arrive at an inspection location of the vehicle inspection station;

causing the autonomous vehicle to enter an inspection mode at the inspection location for inspection, wherein an inspection barrier is placed in front of the autonomous vehicle during the inspection;

determining that the inspection barrier is removed from the front of the autonomous vehicle; and in response to determining that the inspection barrier is removed from the front of the autonomous vehicle, releasing the autonomous vehicle from the inspection mode and controlling the autonomous vehicle to exit the vehicle inspection station.

26. An autonomous vehicle control system for controlling an autonomous vehicle in an environment that includes a vehicle inspection station, the autonomous vehicle control system comprising:

one or more processors; and memory storing instructions that, when executed by the one or more processors, cause the autonomous vehicle control system to perform a plurality of operations comprising:

determining that an operating status of the vehicle inspection station is active;

in response to determining that the operating status of the vehicle inspection station is active, controlling the autonomous vehicle to navigate to an inspection location of the vehicle inspection station;

causing the autonomous vehicle to enter an inspection mode at the inspection location for a predetermined period of time, for inspection of the autonomous vehicle;

determining whether the inspection of the autonomous vehicle is complete in response to the autonomous vehicle being in the inspection mode for the predetermined period of time; and in response to determining that the inspection of the autonomous vehicle is complete in response to the autonomous vehicle being in the inspection mode for the predetermined period of time, releasing the autonomous vehicle from the inspection mode and controlling the autonomous vehicle to exit the vehicle inspection station.

* * * * *